United States Patent Office 3,247,192
Patented Apr. 19, 1966

3,247,192
18,20-LACTONE OF 20-HYDROXY-PREGNANE-18-ACIDS
Oskar Jeger, Zurich, Duilio Arigoni, Zollikerberg, Georg Anner and Charles Meystre, Basel, Albert Wettstein, Riehen, and Karl Heusler and Peter Wieland, Basel, Switzerland, assignors to Ciba Corporation, a corporation of Delaware
No Drawing. Filed Dec. 8, 1960, Ser. No. 74,470
Claims priority, application Switzerland, Feb. 12, 1959, 69,475/59; Apr. 23, 1959, 72,443/59; Dec. 11, 1959, 81,780/59; Dec. 22, 1959, 82,231/59; Feb. 18, 1960, 1,858/60; Mar. 25, 1960, 3,375/60; July 21, 1960, 8,354/60
22 Claims. (Cl. 260—239.57)

This application is a continuation-in-part of our copending application Ser. No. 7543, filed February 9, 1960.

The present invention relates to new 18,20-lactones of 20-hydroxy-pregnane-18-acids.

The 18-oxygenated steroids, particularly 18-oxygenated pregnanes, are of great interest on account of their interesting physiological effects. To this class of compounds there belongs, inter alia, aldosterone which is of considerable importance owing to its specific effect on electrolyte-metabolism. The latter compound, however, is present in the suprarenal glands only in an extremely small quantity. Larger amounts could hitherto only be prepared by totol synthesis from simple chemical basic substances involving many steps. However, new processes were discovered by which 18,20-lactones of 20-hydroxy-pregnane-18-acids can be produced in good yield from readily available starting materials. Since these lactones can easily be converted into the known physiologically active 18-oxygenated steroid hormones, they form a class of key intermediates in the production of these hormones.

One of the processes for the production of the 18,20-lactones of the invention is described in copending applications Ser. Nos. 7525, 7542, 7528 (now U.S. Patent 3,040,040), 7543, filed February 9, 1960.

It is illustrated in the following diagram of partial formulae with an 11-oxygenated compound as example

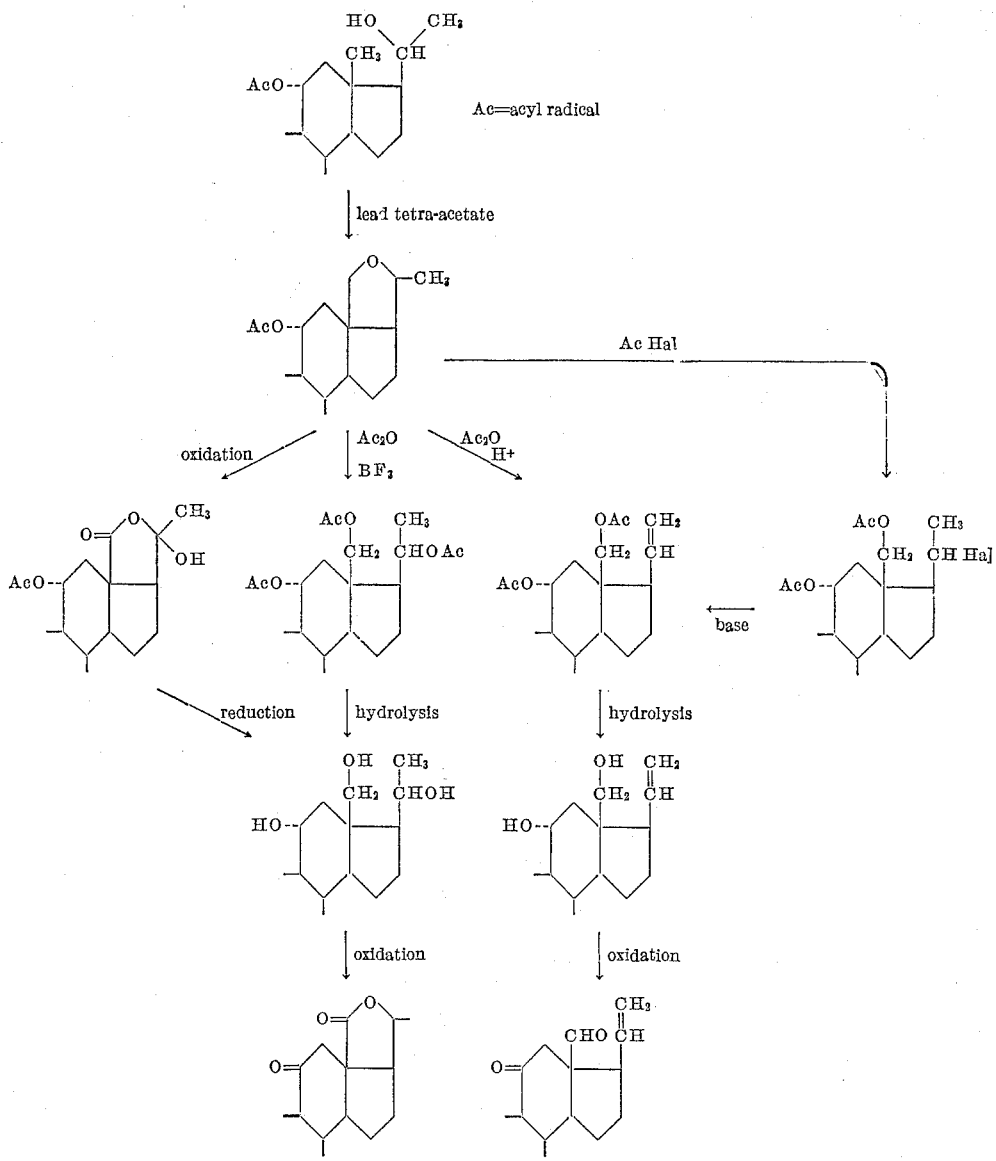

According to this process an 18-unsubstituted 20-hydroxy-pregnane compound is heated with lead tetra-acetate, an 18,20-oxide formed is then opened by acylolytic cleavage to give an 18,20-diacyloxy-pregnane, which is then hydrolyzed to an 18,20-dihydroxy compound which on oxidation is converted to an 18,20-lactone of a 20-hydroxy-pregnane compound.

Another process for the production of these lactones which is described in our copending applications Ser, Nos. 74,486, now abandoned, and 74,487, now U.S. Patent No. 3,121,080, filed December 8, 1960, consists in treating an 18-unsubstituted 20-hydroxy-pregnane compound with a lead acylate having oxidizing action, such as lead tetraacetate, in the presence of iodine, and subjecting the products formed to oxidation with a compound of hexavalent chromium, such as chromium trioxid in the presence of a heavy metal chromate, such as silver chromate.

The 18,20-lactones of the 20-hydroxy-pregnane 18-acids obtainable according to these processes may belong to the $5\alpha$ or $5\beta$ series, including also derivatives of the 19- nor series, and which may be further substituted in one or more of the positions 1, 2, 3, 4, 5, 6, 7, 8, 9, 10, 11, 12, 14, 15, 16, 17 or 21, e.g. by oxido groups, free or functionally converted hydroxy- or oxo groups, alkyl groups, such as methyl groups or halogen atoms. As functionally converted hydroxyl groups there are to be understood esterified or etherified hydroxyl and by functionally converted oxo groups enolized, ketalized, oxo groups, enamines, semi-carbazones and hydrazones. Especially important compounds are those which are substituted in the 3-position by an esterified or etherified hydroxyl group or a free or ketalized oxo group, and which may also contain a double bond in one of the positions 4,5 or 5,6. In the compounds which have esterified hydroxyl groups the acid radicals may be those of a lower aliphatic mono- or dicarboxylic acid, preferably having from 1 to 8 carbon atoms, such acetic, propionic, butyric, trimethylacetic, succinic, glutaric, glycolic and diglycolic acids, trifluoracetic acid or an aromatic carboxylic, preferably a monocyclic acid, such as benzoic acid, a monocyclic cycloaliphatic acid or araliphatic acid, such as hexahydrophthalic acids, tetrahydrophthalic acids, cyclohexanoic acid, cinnamic acid, phenylpropionic acid, aliphatic or aromatic hetrocyclic acids, such as furancarboxylic acid, nicotinic acid or also of sulfonic acids, such as methano sulfonic acid, benzenesulfonic, paratoluene sulfonic acid or the like. Among the compounds having ketalized oxo groups there are especially to be mentioned those which have oxo group ketalized with a lower divalent aliphatic alcohol, such as ethylene glycol, propylene glycol and the like.

When a lactone obtained according to the above processes contains an esterified hydroxyl group in the $11\alpha$-position this group can be hydrolyzed in known manner to a free hydroxyl group which can then be oxidized to an 11-ketone, for example with chromium trioxide in known manner. If desired, a $\Delta^5$-3-ketal present in a lactone obtained may be hydrolyzed to a $\Delta^4$-3-ketone or such a grouping ketalized to a $\Delta^5$-3-ketal.

In lactones which do not contain a free or protected $\Delta^4$-3-keto grouping in ring A such a group can be introduced in the conventional manner. 18,20-lactones of 3; $11\alpha$-diacyloxy-20-hydroxy-pregnane-18-acids of the $5\alpha$- or $5\beta$-series for example can easily be converted into 18, 20-lactones of 3-oxo-$11\alpha$-acyloxy-20 - hydroxy-pregnane-18-acids by simultaneous hydrolysis of both acyloxy groups and selective oxidation in the 3-position (for example with an N-bromo or N-chloro carboxylic acid amide or imide, with an organic hypohalite, such as tertiary butyl chlorite or with chlorine) and reesterification in the $11\alpha$-position. Alternatively, in a 3;$11\alpha$-diacyloxylactone the 3-acyloxy group may be hydrolyzed selectively (for example with an alkali metal carbonate or bicarbonate at relatively low temperature or with a mineral acid) and the free 3-hydroxy group can then be oxidized with a derivative of hexavalent chromium, such as chromium trioxide or sodium dichromate. Into the 18,20-lactones of 3-oxo-$11\alpha$-acyloxy-20 - hydroxy-pregnanes thus obtained 4,5-double bond can then be introduced by bromination and dehydrobromination. Surprisingly, this can also be smoothly achieved with the above 3-ketones of the $5\alpha$-series since it was observed that from the 2-bromo-3-oxo-lactone obtained by bromination the $\Delta^4$-3-oxo-lactone is formed in high yield by treatment with a lithium halide in a dialkyl formamide at high temperature, advantageously with the addition of lithium carbonate.

From 18,20-lactones with a $\Delta^5$-3-acyloxy grouping $\Delta^4$-3-ketones are produced in known manner by hydrolysis and oxidation for example by the method of Oppenauer or with chromium trioxide-sulfuric acid and subsequent isomerization of the $\Delta^5$-3-ketone formed.

An $11\alpha$-hydroxyl group can be introduced into 18,20-lactones which do not contain any substituent in the 11-position by microbiological means, for example by the action of fungi of the order Mucorales, Rhizopus or by *Aspergillus ochraceus* in known manner.

On the other hand it is possible to eliminate the $11\alpha$-hydroxyl group in a resulting 18,20-lactone of an $11\alpha$,20-dihydroxypregnane-18-acid by conversion into a sulfonic acid ester, for example a mesylate or tosylate, and subsequent treatment with an anhydrous base, for example collidine or potassium acetate or lithium chloride, for example in dimethyl formamide, accompanied by formation of a 9,11-double bond.

The products of the present invention are important intermediates for the manufacture of steroids containing an oxygen function in the 18-position of the type of the highly active adrenocortical hormone aldosterone. The conversion of a typical final product of the present invention into aldosterone is represented by the following scheme of reactions

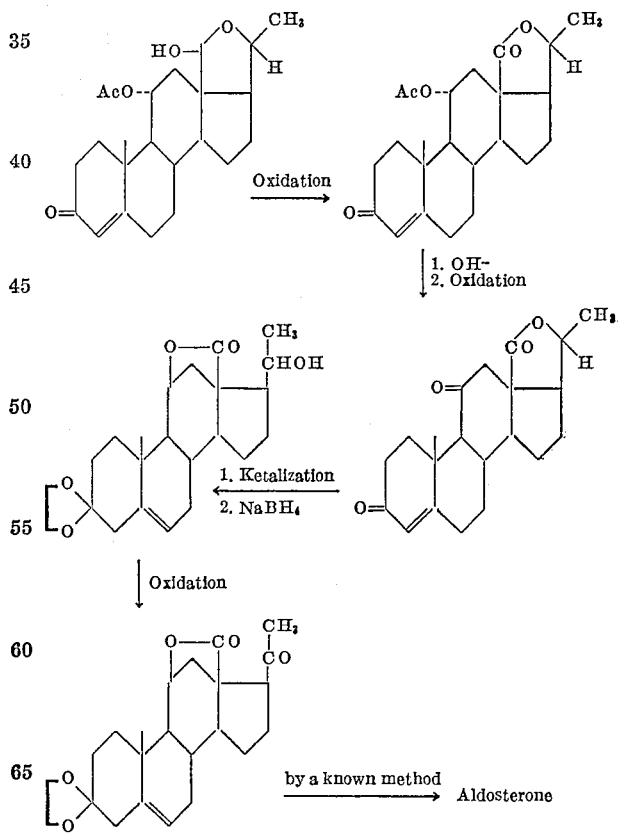

$9\alpha$-halogen-derivatives of aldosterone and of related compounds, such as the $(11\beta \rightarrow 18)$-lactones of 11-hydroxy-pregnane-18-acids may be prepared from 18,20-lactones of 20-hydroxy-pregnane-18-acids of the present invention, which are unsaturated in the 9,11-position or which contain a $9,11\beta$-oxido group; when hypohalous acid is e.g. added in known manner onto said 9,11-double bond, the 18,11-lactones of the 9-halogeno (more especially 9α-chloro- and 9α-bromo)-11β,20-dihydroxy-pregnane - 18-acids are obtained which are easy to oxidize to the 18,11-lactones of the 9α-halogeno-11β-hydroxy-20-oxopregnane-18-acids.

The corresponding 18,11-lactones of the 9α-fluoro-11β-hydroxypregnane-18-acids are obtained by using as starting material an 18,20-lactone of a 9,11β-oxido-20-hydroxy-pregnane-18-acid. The 9,11β-epoxide can be split up with hydrofluoric acid in the known manner. The 18,11-lactones of 9α-fluoro-11β,20 - dihydroxypregnane - 18-acids obtained can be oxidized, for example with chromium trioxide, to form the 18,11-lactones of 9α-fluoro-11β-hydroxy-20-oxopregnane-18-acids.

Particularly important products of this invention are the 18,20-lactones of the following pregnane-18-acids, which may belong to the 20α- or 20β-series:

3β,20-dihydroxy-5α-pregnane-18-acid,
3β,20,dihydroxy-11-oxo-5α-pregnane-18-acid,
3β,20-dihydroxy-11β-acyloxy-5α-pregnane-18-acid,
3β,11α,20-trihydroxy-5α-pregnane-18-acid,
3α,20-dihydroxy-5β-pregnane-18-acid,
3α,20-dihydroxy-11-oxo-5β-pregnane-18-acid,
3α,20-dihydroxy-11β-acyloxy-5β-pregnane-18-acid,
3β,11α,20-trihydroxy-5α-pregnane-18-acid,
3α,11α,20-trihydroxy-5β-pregnane-18-acid,
3-oxo-11α,20-dihydroxy-5α- and -5β-pregnane-18-acid,
$\Delta^4$-3-oxo11α,20-dihydroxy-pregnane-18-acid,
$\Delta^4$-3-oxo-11α-acetoxy-20-hydroxy-pregnane-18-acid,
$\Delta^4$-3-oxo-20-hydroxy-pregnane-18-acid,
$\Delta^5$-3β,20-dihydroxy-pregnane-18-acid,
$\Delta^5$-3-ethylenedioxy-11α,20-dihydroxy-pregnane-18-acid,
$\Delta^5$-3-ethylenedioxy-11α,20-dihydroxy-pregnane-18-acid,
$\Delta^5$-3-ethylenedioxy-11α-acetoxy-20-hydroxy-pregnene-18-acid,
$\Delta^4$-3-oxo-11β-acetoxy-20-hydroxy-pregnene-18-acid,
$\Delta^5$-3-ethylenedioxy-11β-acetoxy-20-hydroxy-pregnene-18-acid,
$\Delta^4$-3,11-dioxo-20-hydroxy-pregnene-18-acid,
$\Delta^5$-3-ethylenedioxy-11-oxo-20-hydroxy-pregnene-18-acid,
$\Delta^{4:9,11}$-3-oxo-20-hydroxy-pregnadiene-18-acid,
$\Delta^{5:9,11}$-3-ethylenedioxy-20-hydroxy-pregnadiene-18-acid,
$\Delta^4$-3-oxo-9,11β-oxido-20-hydroxy-pregnene-18-acid,
$\Delta^5$-3-ethylenedioxy-9,11β-oxido-20-hydroxy-pregnene-18-acid,
$\Delta^{1,4}$-3-oxo-20-hydroxy-pregnadiene-18-acid,
$\Delta^4$-3,11-dioxo-20-hydroxy-19-norpregnene-18-acid,
$\Delta^5$-3-ethylenedioxy-11-oxo-20-hydroxy-19-norpregnene-18-acid and the corresponding compounds in which the free hydroxyl groups are esterified, for example with one of the acids mentioned above.

The following examples illustrate the invention:

Example 1

A solution of 4.9 grams of chromium trioxide in 10 cc. of water and 140 cc. of glacial acetic acid is added at such a speed to a solution of 4.59 grams of 3α,11α,18,20α-tetrahydroxy-5β-pregnane in 300 cc. of glacial acetic acid while cooling with ice water and stirring that the internal temperature does not exceed 16° C. The reaction mixture is stirred for 17½ hours at room temperature, a solution of 3 grams of sodium sulfite in 50 cc. of water is added and the mixture evaporated to a volume of 100 cc. at a water-jet vacuum at a bath temperature of 40° C. The solution is diluted with 400 cc. of sodium chloride solution of 6% strength, extracted four times with 300 cc. of methylene chloride and the organic solution washed twice with 400 cc. of sodium chloride solution of 6% strength. The methylene chloride solutions are dried and evaporated at a water-jet vacuum and the residue dissolved in 50 cc. of benzene and chromatographed on 250 grams of silica gel (containing 15% of water). The fractions eluted with a mixture of benzene and ethyl acetate (9:1) are recrystallized from a mixture of methylene chloride and ether to yield 1.45 grams of the 18→20-lactone of 3,11-diketo-20α-hydroxy-5β-pregnane-18-acid melting at 213.5–214° C. Further recrystallization raises the melting point to 214.5–215° C. Optical rotation: $[\alpha]_D = +1°$ (in chloroform). Infrared spectrum (solvent: methylene chloride): 5.65μ (γ-lactone) and 5.82μ (3-ketone+11-ketone).

When a mixture of 0.267 gram of chromium trioxide and 0.23 cc. of sulfuric acid made up to 1 cc. with water is added to a solution of 102 mg of 3α,11α,18,20α-tetrahydroxy-5β-pregnane in 12 cc. of acetone in the course of a minute with ice cooling and stirring, there are obtained after 10 minutes' stirring at 0° C., working up and chromatography on silica gel, 15 mg. of the above described lactone.

A solution of 1.45 grams of the 18→20-lactone of 3,11-diketo-20α-hydroxy-5β-pregnane-18-acid in 45 cc. of glacial acetic acid is treated with 1.7 cc. of a 0.1 N-solution of hydrobromide in glacial acetic acid and then in the course of ten minutes with stirring with 12 cc. of a 0.735 N-solution of bromine in glacial acetic acid containing 386 mg. of sodium acetate. The reaction solution is diluted with 250 cc. of water, extracted three times with methylene chloride and the organic solutions washed once with 300 cc. of saturated sodium bicarbonate solution and once with 100 cc. of water. The organic solutions are dried and evaporated at a water-jet vacuum at a bath temperature of 35° C., the residue is added with 10 cc. of dimethylformamide to a mixture of 1.5 grams of dry lithium chloride, 1.5 grams of lithium carbonate and 30 cc. of dimethylformamide which has been previously heated in a current of nitrogen at 100° C. with stirring for 45 minutes and then cooled. The reaction mixture is heated for two hours in a current of nitrogen at 100° C. with stirring, allowed to stand overnight at room temperature and poured on to 150 cc. of water and 3 cc. of glacial acetic acid and extracted three times with 130 cc. of methylene chloride. The methylene chloride extracts are washed twice with 150 cc. of water, dried and evaporated at a water-jet vacuum. To remove dimethylformamide the reaction solution is dissolved in xylene, evaporated at a water-jet vacuum, and this operation is repeated once with xylene and once with benzene. The residue is chromatographed on 75 grams of silica gel (containing 15% of water). The crystalline fractions obtained with mixtures of benzene and ethyl acetate (9:11) and (4:1) are recrystallized from a mixture of methylene chloride and ether to yield 630 mg. of the 18→20-lactone of $\Delta^4$-3,11-diketo-20α-hydroxy-pregnene-18-acid which, after sublimation at 200° C. in a high vacuum and recrystallization, melts at 257° C., $\epsilon_{239\mu} = 14,500$; optical rotation $[\alpha]_D = +140°$ (in chloroform). Infra-red spectrum (solvent: methylene chloride): 5.65μ (γ-lactone); 5.80μ (11-ketone) and 5.96μ+6.16μ ($\Delta^4$-3-ketone).

605 m. of the 18→20-lactone of $\Delta^4$-3,11-diketo-20α-hydroxy-pregnene-18-acid are treated with a solution of 36 mg. of para-toluene-sulfonic acid in 60 cc. of ethylene glycol, whereupon 15 cc. of the solvent are distilled off at a water-jet vacuum in the course of 30 minutes with stirring. The violet colored reaction solution is then treated with 145 cc. of water and 5 cc. of saturated sodium bicarbonate solution and extracted three times with methylene chloride. The organic solutions are washed twice with water, dried and evaporated at a water-jet vacuum. The residue is chromatographed on 25 grams of silica gel (containing 15% of water). The fractions eluted with a mixture of benzene and ethyl acetate (9:1) are recrystallized from a mixture of methylene chloride and ether to yield 390 mg. of the 18→20-lactone of $\Delta^5$-3-ethylenedioxy - 11 - keto-20α-hydroxy-pregnene - 18 - acid which, after further recrystallization, melts at 274–275.5° C. Optical rotation: $[\alpha]_D = -23.5°$ (in chloroform). Infra-red spectrum (solvent: methylene chloride): 5.66μ (γ-lactone); 5.82μ (11-ketone) and 9.08μ (ketal).

200 mg. of sodium boron hydride are added to a suspension of 130 mg. of the 18→20-lactone of Δ$^5$-3-ethylenedioxy-11-keton-20α-hydroxy-pregnene-18-acid in 9 cc. of alcohol and 1 cc. of N-sodium hydroxide solution. After stirring for 4½ hours at room temperature, 10 cc. of tetrahydrofuran are added, the substance dissolving. 22 hours later a further 100 mg. of sodium boron hydride is added and the whole is then stirred for 28 hours at 40° C. The reaction solution is then poured on to water and 1 cc. of glacial acetic acid, extracted four times with methylene chloride, washed once with water, dried and evaporated at a water-jet vacuum. The crystalline residue consisting of the 18→11-lactone of Δ$^5$-3-ethylenedioxy-11β,20α-dihydroxy-pregnene-18-acid is added with 5 cc. of pyridine to a mixture of 100 mg. of chromium trioxide and 5 cc. of pyridine with ice-cooling and stirring. The reaction mixture is stirred for 16 hours at room temperature, diluted with water and extracted three times with benzene and filtered through Celite to separate off any undissolved constituents. The organic solutions are washed twice more with water, dried and evaporated at a water-jet vacuum. The reaction mass is dissolved in xylene, evaporated again at a water-jet vacuum, and this operation is repeated once with benzene. The resulting crystalline residue is chromatographed on 8.5 grams of silica gel (containing 15% of water). The crystalline fractions eluted with a mixture of benzene and ethyl acetate (9:1) are recrystallized from a mixture of methylene chloride and ether to yield 43 mg. of the 18→11-lactone of Δ$^5$-3-ethylenedioxy-11β-hydroxy-20-keto-pregnene-18-acid melting at 239.5–240.5° C. Optical rotation: $[\alpha]_D = +1°$ (in chloroform). Its infrared spectrum (solvent: methylene chloride) is identical with that of the authentic 18→11-lactone of d,l-Δ$^5$-3-ethylenedioxy-11β-hydroxy-20-keto-pregnene-18-acid.

The conversion of this product into aldosterone is carried out in known manner by condensation of the oxalic ester to the 21-oxalo-ester melting at 160–175° C., iodization, treatment with potassium acetate to form the 21-acetate melting at 237.5–239.5° C. (optical rotation $[\alpha]_D = -33°$ in chloroform) and hydrolysis to form the 18→11-lactone of Δ$^4$-3,20-diketo-11β,21-dihydroxy-pregnene-18-acid melting at 214–217° C. (optical rotation $[\alpha]_D = +173°$ in chloroform). The above compound is subjected in known manner to ketalization, reduction with lithium aluminum hydroxide, acetylation and ketal-splitting to form the 21-monoacetate of aldosterone.

*Example 2*

250 mg. of 3α,11α,18,20α-tetrahydroxy-5β-pregnane are added to a mixture of 500 mg. of chromium trioxide and 10 cc. of pyridine with stirring and ice cooling and the mixture is then stirred for 15½ hours at room temperature. It is then diluted with water and extracted three times with benzene and then filtered through Celite to separate off any undissolved consitituents. The organic solutions are washed twice with water, twice with 2N-sodium carbonate solution and twice with water. The organic solutions are dried and evaporated in a water-jet vacuum and the residue dissolved in xylene, and this operation repeated once with benzene. Chromatography is carried out on 12.5 grams of silica gel (containing 15% of water) and the following compounds eluted successively with mixtures of benzene and ethyl acetate: (a) 8.5 mg. of the 18→20-lactone of 3,11-diketo-20α-hydroxy-5β-pregnane-18-acid described in Example 1. The infrared spectra are identical. (b) 55 mg. of the 18→20-cyclohemiketal of 3,11,20-triketo-18-hydroxy-5β-pregnane melting at 186.5–194° C. Further recrystallization from a mixture of methylene chloride, ether and petroleum ether raises the melting point to 192.5–195.5° C. Infrared spectrum (solvent: methylene chloride): 2.75μ + 2.91μ (hydroxyl) and 5.82μ (3-ketone + 11-ketone).

(c) 10 mg. of 3,11,20-triketo-18-oxo-5β-pregnane melting at 248.5–252.5° C. Infra-red spectrum (solvent: methylene chloride): 3.61μ (aldehyde) and 5.82μ with inflexion at 5.78μ (3,11 and 20-ketone + aldehyde).

*Example 3*

A solution of 70 mg. of 3,11-diketo-18,20α-dihydroxy-5β-pregnane in 10 cc. of acetone is treated for 30 minutes at 0° C. with 1 cc. of Kiliani solution. After adding a little methanol, the solution is worked up in the ordinary manner, 57 mg. of a neutral portion being obtained which crystallizes on being sprinkled with methanol. The crystals are filtered in a benzene solution through a small column of aluminum oxide of activity II, and the resulting (18→20)-lactone of 3,11-diketo-20α-hydroxy-5β-pregnane-18-acid has a constant melting point of 211–212° C. after being recrystallized three times from a mixture of acetone and heptane. Optical rotation: $[\alpha]_D = -0.5°$. Infra-red spectrum: bands at 5.65μ and 5.81μ in Nujol.

*Example 4*

120 mg. of chromium trioxide dissolved in 5 drops of water and 10 cc. of glacial acetic acid are added to 150 mg. of 3β,18,20α-trihydroxy-5α-pregnane in 20 cc. of glacial acetic acid and the whole allowed to stand overnight at room temperature. The mixture is treated with a few drops of methanol and worked up with ether in the usual way. The crystalline crude product (168 mg.) is purified by chromatography on neutral aluminum oxide (activity II). With a mixture of petroleum ether and benzene (1:1) 90 mg. of 20α-hydroxy-3-keto-5α-pregnane-18-acid-lactone are eluted from the column which has a constant melting point of 174–175° C. after being crystallized three times from a mixture of methanol and water. Optical rotation $[\alpha]_D = +17°$; infra-red spectrum; bands at 5.68μ and 5.84μ in chloroform.

500 mg. of sodium boron hydride are added to 130 mg. of the above lactone dissolved in 30 cc. of absolute dioxane and the whole boiled under reflux for 2 hours. The mixture is poured on to dilute sulfuric acid and worked up with ether in the ordinary manner. The resulting crude product (120 mg.) is purified by chromatography on neutral aluminum oxide (activity II). An oil (100 mg.) which cannot be made to crystallize is eluted with benzene. The crude hydroxy-lactone is acetylated overnight at room temperature with 10 cc. of pyridine-acetic anhydride (1:1). Usual working up yields a crystalline product (120 mg.) which is chromatographed on neutral aluminum oxide (activity II). With a mixture of petroleum and benzene (9:1) 75 mg. of 3β-acetoxy-20α-hydroxy-5α-pregnane-18-acid-lactone are eluted which, after being crystallized three times from a mixture of methanol and water, has a constant melting point of 196–197° C. Optical rotation: $[\alpha]_D = -14°$; infra-red spectrum; bands at 5.68μ, 5.80μ and 8.00μ in chloroform.

*Example 5*

A mixture of 1 gram of 3β-acetoxy-20β-hydroxy-5α-pregnane, 6 grams of lead tetraacetate dried in a high vacuum, 2 grams of calcium carbonate and 2 grams of iodine is covered with 200 cc. of cyclohexane. The suspension is refluxed with stirring for 1½ hours with a calcium chloride closure, cooled and suction-filtered. The residue is washed with ether, the solution is diluted with ether and washed with an aqueous sodium thisosulfate solution and with water, dried and evaporated in vacuo at first at 40–50° C. and then at 20° C. The residue is treated with 2 grams of sodium acetate and 50 cc. of acetic acid of 80% strength. The solution is heated for one hour on a water bath, evaporated in vacuo, and the residue is taken up in ether. The ethereal solution is washed with dilute sodium carbonate solution and with water, dried and evaporated in vacuo. The crystalline residue (1.30 grams) is dissolved in 10 cc. of pyridine and mixed with a solution of 2 grams of chromium trioxide in 4 cc. of water and 10 cc. of pyridine.

The solution is kept for 15 hours at 20° C., ice and a small amount of sodium bisulfite solution are then added, and the whole is extracted with ether. The ethereal solution is washed with dilute sodium carbonate solution and water, dried and evaporated in vacuo. The residue (1.2 grams) is chromatographed on 30 grams of alumina of activity II, elution being performed first with hexane and then with a 1:1-mixture of pentane and benzene. The first hexane fractions yield on evaporation 200 mg. of oily products. The further fractions eluted with hexane and pentane+benzene are combined and recrystallized from hexane, to yield 400 mg. of the 18,20β-lactone of 3β-acetoxy-20β-hydroxy-5α-pregnane-18-acid melting at 197–207° C. Infra-red spectrum in methylene chloride: bands inter alia at 5.73μ (5-ring lactone) and at 5.81, 8.08 and 9.74μ (acetate). Chromatography of the mother liquors yields a further amount of this lactone. The evaporated ethereal eluates of the chromatography yield on recrystallization from hexane+pentane 90 mg. of 3β-acetoxy-20-hydroxy-18,20-oxido-5α-pregnane melting at 184–194° C. Infra-red spectrum in methylene chloride: Bands inter alia at 2.70μ (hydroxyl) and at 5.81, 8.08 and 9.71μ (acetate).

A solution of 50 mg. of the latter compound in 5 cc. of methanol of 80% strength is treated with 50 mg. of potassium carbonate. The solution is refluxed for one hour, then evaporated in vacuo and the residue is taken up in ether. The ethereal solution is washed with water, dried and evaporated in vacuo. The residue can be crystallized from acetone or aqueous acetone. The resulting, known 3β,20-dihydroxy-18,20-oxido-5α-pregnane melts at 163–167° C. Infra-red spectrum in methylene chloride: Bands inter alia at 2.73μ (hydroxyl) and at 9.67μ.

A solution of 100 mg. of the 18,20β-lactone of 3β-acetoxy-20β-hydroxy-5α-pregnane-18-acid in 5 cc. of methanol of 80% strength is treated with 100 mg. of potassium carbonate, boiled for one hour, under reflux, evaporated in vacuo and the residue is agitated with ethyl acetate. The ethyl acetate solutions are washed with water, dried and evaporated in vacuo. When the residue is recrystallized from ether+pentane it yields fine needles of the 18,20-lactone of 3β,20β-dihydroxy-5β-pregnane-18-acid melting at 215–219° C. Infra-red spectrum in methylene chloride: Bands inter alia at 2.70μ (hydroxyl) and at 5.72μ (5-ring lactone). A solution of this compound in 3 cc. of glacial acetic acid is treated with a solution of 150 mg. of chromium trioxide in 0.3 cc. of water, and the mixture is kept for 15 hours at 20° C. The excess chromic acid is then decomposed with a small amount of sodium bisulfite solution in the presence of ice, the suspension is agitated with ethyl acetate, the ethyl acetate solutions are washed successively with water, dilute sodium carbonate solution and water, dried and evaporated in vacuo. When the residue is crystallized from a mixture of methylene chloride and ether it yields the 18,20β-lactone of 3-oxo-20β-hydroxy-5α-pregnane-18-acid in the form of needles melting at 235–250° C. Infra-red spectrum in methylene chloride: Bands inter alia at 5.72μ (5-ring lactone) and 5.86μ (3-ketone). This compound is brominated and dehydrobrominated with lithium bromide in dimethylformamide in a fully analogous manner to that described in Example 22. From the resulting mixture the 18,20-lactone of the Δ⁴-3-oxo-20β-hydroxy-pregnene-18-acid melting at 208–210° is isolated after chromatography on alumina.

A solution of 100 mg. of the lactone of 3β,20β-dihydroxy-5α-pregnane-18-acid in 20 cc. of ether and 20 cc. of tetrahydrofuran is treated with 100 mg. of lithium aluminum hydride and kept for 20 minutes at 20° C. The mixture is then cautiously treated with ethyl acetate. The solution is concentrated and then further diluted with ethyl acetate, washed with dilute hydrochloric acid and water, dried and concentrated in vacuo. The separating crystals are recrystallized from acetone+pentane. The resulting 3β,18,20β-trihydroxy-5α-pregnane melts at 236° C. (conversion of the crystals at 220° C.). Infra-red spectrum in Nujol: Band inter alia at 2.97μ (hydroxyl).

*Example 6*

A mixture of 6 grams of lead tetraacetate dried in a high vacuum at 20° C., 2 grams of iodine and 2 grams of anhydrous calcium carbonate is covered with 200 cc. of cyclohexane. The suspension is refluxed with stirring for one hour under a calcium chloride seal. 1 gram of Δ⁵-3-ethylenedioxy-11α-acetoxy-20β-hydroxy-pregnene is then added and the mixture is refluxed for another 6 hours, then cooled, and the inorganic salts are suctioned off and washed with ether. The solution is then diluted with ether, shaken with sodium thiosulfate solution and water and the ethereal solutions are treated with 2 grams of sodium acetate and 50 cc. of acetic acid of 80% strength. The ether is distilled off on a water bath and the remaining acetic acid solution is heated for another 2 hours on a boiling water bath, considerably concentrated in vacuo, and the residue is taken up in ether and water. The ethereal solution is washed with dilute sodium carbonate solution and water, dried and evaporated. The residue (1.05 grams) contains Δ⁴-3-oxo-11α-acetoxy-18-hydroxy-18,20β-oxido-pregnene. The whole is covered with a solution of 1 gram of potassium carbonate in 10 cc. of water and 50 cc. of methanol. The resulting solution is refluxed for 5 hours, considerably concentrated in vacuo, and the residue is taken up in ethyl acetate and water; the ethyl acetate solution is washed with dilute sodium carbonate solution and water, dried and evaporated in vacuo, to yield 710 mg. of crude Δ⁴-3-oxo-11α-18-dihydroxy-18,20β-oxido-pregnene which is dissolved in 5 cc. of pyridine and treated with a cooled mixture of 1 gram of chromium trioxide in 2 cc. of water and 5 cc. of pyridine. The oxidation mixture is kept for 15 hours at 20° C., treated with ice and an aqueous solution of 2 grams of sodium sulfite, concentrated in vacuo and the residue is extracted with ethyl acetate. The ethyl acetate solution is washed with dilute hydrochloric acid, water, dilute sodium carbonate solution and water, dried and evaporated in vacuo. The residue is recrystallized from acetone or acetone+pentane and yields the 18,20β-lactone of Δ⁴-3,11-dioxo-20β-hydroxy-pregnene-18-acid in the form of prisms melting at 252–260° C. Infra-red spectrum in methylene chloride: bands inter alia at 5.71μ (5-ring lactone), 5.86μ (11-ketone), 6.00 and 6.22μ (Δ⁴-3-ketone).

A mixture of 200 mg. of the resulting diketo-lactone and 40 mg. of para-toluenesulfonic acid is covered with 10 cc. of ethylene glycol and 100 cc. of benzene. The solution is refluxed with stirring for 6 hours with the use of a water separator. The cooled solution is diluted with ethyl acetate and washed with dilute sodium carbonate solution and water, dried and evaporated in vacuo. The residue crystallises from a mixture of methylene chloride and ether. The resulting 18,20-lactone of Δ⁵-3-ethylenedioxy-11-oxo-20β-hydroxy-pregnene-18-acid melts at 240–260°; however, over about 220° C. it begins to undergo conversion into needles. Infra-red spectrum in methylene chloride: bands inter alia at 5.69μ (5-ring lactone), 5.86μ (11-ketone) and 9.03μ (Δ⁵-3-ketal).

110 mg. of the resulting ketal and 200 mg. of sodium borohydride are dissolved at 0° C. in a mixture of 9 cc. of rectified alcohol, 1 cc. of N-sodium hydroxide solution and 10 cc. of tetrahydrofuran. The solution is stirred for 3 days at 40° C., treated with water, concentrated in vacuo, shaken with ethyl acetate and the ethyl acetate solution is washed with 1.5 N-phosphoric acid and ice, then with water, dried and evaporated in vacuo. After one recrystallization from ether+pentane the residue yields the 18,11-lactone of Δ⁵-3-ethylenedioxy-11β,20β-dihydroxy-pregnene-18-acid melting at 203–213° C. On further recrystallization the melting point of the product rises to 220–230° C. The two crystal forms display in the infra-red spectrum in methylene chloride the identical bands inter alia at 2.74μ (hydroxyl), 5.70μ (5-ring lactone) and 9.08μ ($\Delta^5$-3-ketal).

A solution of 100 mg. of the 18,11-lactone of $\Delta^5$-3-ethylenedioxy-11β,20β-dihydroxy-pregnene-18-acid in 1 cc. of pyridine is treated with a mixture of 200 mg. of chromium trioxide in 0.4 cc. of water and 1 cc. of pyridine and heated for 15 hours at 60° C. The reaction mixture is then treated with ice and a small amount of sodium sulfite solution, extracted with ethyl acetate, washed with 1.5 N-phosphoric acid and ice, water, dilute sodium carbonate solution and water, dried and evaporated in vacuo. The residue yields the known 18,11-lactone of $\Delta^5$-3-ethylenedioxy - 3,20 - dioxo-11β-hydroxy-pregnene-18-acid by crystallization from ether+pentane in the form of needles melting at 239.5–240.5° C. Optical rotation $[\alpha]_D = +1°$ (in chloroform). Infra-red spectrum; bands inter alia at 5.62μ (5-ring lactone), 5.82μ (20-ketone) and 9.07μ ($\Delta^5$-3-ketal).

*Example 7*

As described in Example 6, 1 gram of $\Delta^5$-3-ethylenedioxy-11α-acetoxy-20β-hydroxy-pregnene is converted into $\Delta^4$ - 3 - oxo-11α-acetoxy-18-hydroxy-18,20β-oxidopregnene. Infra-red spectrum in methylene chloride: bands inter alia at 2.70μ (hydroxyl), 5.82, 8.09 and 9.75μ (acetate) and at 6.02μ and 6.22μ ($\Delta^4$-3-ketone). The resulting crude product (1.05 grams) is dissolved in 5 cc. of pyridine and treated with a cooled solution of 1.5 grams of chromium trioxide in 3 cc. of water and 5 cc. of pyridine. The solution is kept for 15 hours at 20° C., then mixed with ice and sodium sulfite solution and evaporated in vacuo. The residue is agitated with ethyl acetate. The ethyl acetate solutions are washed with dilute hydrochloric acid, water, dilute sodium carbonate solution and water, dried and evaporated in vacuo. The residue (810 mg.) is chromatographed on 25 grams of alumina of activity II. From the first 1:1-fractions of benzene and pentane a mixture of ether and pentane yields about 20 mg. of crystals melting at 186–195° C. The eluates obtained with 1:1 benzene+pentane, benzene and ether (total 500 mg.) yield a product which, after having been recrystallized from ether+pentane, melts at 188–194° C. (it is not identical with the crystals from the first fractions) and which is the 18,20-lactone of $\Delta^4$-3-oxo-11α-acetoxy-20β-hydroxy-pregnene-18-acid. Infra-red spectrum in methylene chloride: bands inter alia at 5.7μ (5-ring lactone), 5.81, 8.09 and 9.72μ (acetate) and at 6.01 and 6.21μ ($\Delta^4$-3-ketone).

A solution of 1 gram of the 18,20-lactone of $\Delta^4$-3-oxo-11α-acetoxy-20β-hydroxy-pregnene-18-acid in 100 cc. of methanol is treated with 20 cc. of water and 1 gram of potassium carbonate, reflexed for 4 hours and then evaporated in vacuo. The residue is agitated with ethyl acetate, and the ethyl acetate solution is washed with water, dried and evaporated in vacuo. Recrystallization from acetone+ether yields the 18,20-lactone of $\Delta^4$-3-oxo-11α,20β-dihydroxy-pregnene-18-acid melting at 178–179° C. Optical rotation $[\alpha]_D = +86°$ (in chloroform). Infra-red spectrum in methylene chloride: bands inter alia at 2.76μ (hydroxyl), 5.69μ (5-ring lactone), 5.98μ and 6.19μ ($\Delta^4$-3-ketone). Ultra-violet spectrum: maximum at 241 mμ ($\epsilon = 16200$).

By treatment of this compound with selenium dioxide in known manner the 18,20-lactone of the $\Delta^{1,4}$-3-oxo-11α,20β-dihydroxy-pregnadiene-18-acid melting at 254–255° is obtained. Infra-red spectrum in methylene chloride: bands inter alia at 2.75μ, 2.95μ, 5.70μ, 6.00μ, 6.20μ, 6.25μ, 10.35μ, 11.70μ and 12.20μ.

In an analogous manner $\Delta^5$-3-ethylenedioxy-11α-acetoxy-20α-hydroxypregnene gives a 52% yield of $\Delta^4$-3-oxo-11α-acetoxy-18-hydroxy-18,20α-oxidopregnene which is oxidized in the above manner to yield the 18,20-lactone of $\Delta^4$-3-oxo-11α-acetoxy-20α-hydroxy-pregnene-18-acid.

*Example 8*

A mixture of 1 gram of $\Delta^{5,9(11)}$-3-ethylenedioxy-20β-hydroxy-pregnadiene, 6 grams of lead tetraacetate dried in a high vacuum, 2 grams of anhydrous calcium carbonate and 2 grams of iodine is covered with 200 cc. of cyclohexane. The suspension is stirred and refluxed for 6 hours with a calcium chloride seal, cooled, the insoluble material is suctioned off and rinsed with ether. The filtrate is washed with sodium thiosulfate solution and water, dried, treated with 2 grams of anhydrous sodium acetate and evaporated in vacuo. The residue is treated with 50 cc. of acetic acid of 80% strength, heated on a boiling water bath, and evaporated in vacuo. The residue is taken up in ether and the ethereal solution is washed with dilute sodium carbonate solution and water, dried and evaporated in vacuo. The infra-red spectrum in methylene chloride of the resulting crude $\Delta^{4,9(11)}$-3-oxo-18-hydroxy-18,20β-oxido-pregnadiene displays bands inter alia at 2.70μ (hydroxyl), 6.00 and 6.22μ ($\Delta^4$-3-ketone). It is dissolved in 5 cc. of pyridine and treated with a solution of 1 gram of chromium trioxide in 2 cc. of water and 5 cc. of pyridine. The solution is kept for 12 hours at 20° C., treated with an aqueous sodium sulfite solution and ice, shaken with ethyl acetate, the ethyl acetate solution is washed with dilute hydrochloric acid, water, sodium carbonate solution and water, dried and evaporated in vacuo. The infra-red spectrum in methylene chloride of the resulting 18,20-lactone of $\Delta^{4,9(11)}$-3-oxo-20β-hydroxy-pregnadiene-18-acid displays bands inter alia at 5.73μ (5-ring lactone), 6.00μ and 6.22μ ($\Delta^4$-3-ketone).

*Example 9*

By the method described in Example 8, $\Delta^5$-3β,21-diacetoxy-20β-hydroxy-pregnene can be converted into $\Delta^5$-3β,21 - diacetoxy - 18-hydroxy-18,20β-oxido-pregnene; its infra-red spectrum in methylene chloride displays bands inter alia at 2.72μ (hydroxyl) and 5.82μ, 8.09μ and 9.74μ (acetate). Oxidation with chromium trioxide yields the 18,20-lactone of $\Delta^5$-3β,21-diacetoxy-20β-hydroxy-pregnene-18-acid. Infra-red spectrum in methylene chloride; bands inter alia at 5.73μ (5-ring lactone) and at 5.82μ, 8.08μ and 5.74μ (acetate).

*Example 10*

By the method described in Example 8, $\Delta^{1,4}$-20β-hydroxy-pregnadiene-3-one can be converted into the corresponding $\Delta^{1,4}$ - 18 - hydroxy-18,20-oxido-pregnadiene-3-one. Infra-red spectrum in methylene chloride: bands inter alia at 2.73μ (hydroxyl) and at 6.02μ, 6.16μ and 6.23μ ($\Delta^{1,4}$-3-ketone). This product is likewise oxidized with chromium trioxide as described in Example 8 to yield the 18,20-lactone of $\Delta^{1,4}$-3-oxo-20β-hydroxy-pregnadiene-18-acid melting at 240–243°. Infra-red spectrum in methylene chloride: bands inter alia at 5.72μ (5-ring lactone) and at 6.01μ, 6.16μ and 6.24μ ($\Delta^{1,4}$-3-ketone).

The starting materials mentioned in Examples 5 to 10 are obtained by reducing the appropriate 20-keto compounds. The 20-hydroxy-pregnane compounds used in Examples 6 to 8 can be prepared for example in the following manner: 11α-acetoxy-progesterone is converted by reduction with sodium borohydride in methanol and selective oxidation with bromoacetamide in benzene +pyridine into $\Delta^4$-3-oxo-11α-acetoxy-20-hydroxy-pregnene which yields $\Delta^5$-3-ethylenedioxy-11α-acetoxy-20-hydroxy-pregnene on ketalization with ethylene glycol and para-toluenesulfonic acid in benzene. An analogous reaction of $\Delta^{4,9(11)}$-3,20-dioxopregnadiene yields $\Delta^{5,9(11)}$-3-ethylenedioxy-20-hydroxypregnadiene.

*Example 11*

A mixture of 6 grams of lead tetraacetate dried in a high vacuum, 2.2 grams of iodine and 2 grams of calcium carbonate is covered with 200 cc. of cyclohexane. The suspension is refluxed with stirring for 30 minutes with exclusion of moisture. 1 gram of 3β-acetoxy-16α-methyl-20β-hydroxy-5α-pregnane is then added. The reaction mixture is boiled for 6 hours, cooled and the insoluble salts are suctioned off and washed with ether.

The filtrate is washed with sodium thiosulfate solution and water, dried and then treated with 2 grams of anhydrous sodium acetate. The solvent mixture is evaporated in vacuo and the residue is dissolved in 50 cc. of acetic acid of 80% strength, heated for 2 hours on a boiling water bath and evaporated. The residue is agitated with ether and the ethereal solution is washed with water, dilute sodium carbonate solution and water, dried and evaporated in vacuo. The infra-red spectrum in methylene chloride of the resulting 3$\beta$-acetoxy-18-hydroxy-18,20$\beta$-oxido-16$\alpha$-methyl-5$\alpha$-pregnane reveals bands inter alia at 2.73$\mu$ (hydroxyl) and at 5.81, 8.09 and 9.74$\mu$ (acetate). The above crude product is dissolved in 10 cc. of pyridine, treated at 0° C. with a solution of 5 grams of chromium trioxide in 10 cc. of water and 10 cc. of pyridine, and the mixture is kept for 15 hours at 20° C., then treated with ice and sodium bisulfite solution, and extracted with ethyl acetate. The ethyl acetate solutions are washed with dilute hydrochloric acid, water, dilute sodium carbonate solution and water, dried and evaporated in vacuo. The residue contains the 18,20-lactone of 3$\beta$-acetoxy-20$\beta$-hydroxy-16$\alpha$-methyl-5$\alpha$-pregnane-18-acid; its infra-red spectrum in methylene chloride contains bands inter alia at 5.71$\mu$ (5-ring lactone) and at 5.82, 8.10 and 9.75$\mu$ (acetate).

The starting material is obtained by subjecting 3$\beta$-acetoxy-16$\alpha$-methyl-20-oxo-5$\alpha$-pregnane to catalytic reduction (platinum+glacial acetic acid).

*Example 12*

60 grams of lead tetraacetate are freed from acetic acid at room temperature in a desiccator for about 30 minutes in a water-jet vacuum and then for about 30 minutes in a high vacuum and then heated to the boil with stirring with 20 grams of anhydrous calcium carbonate and 1.8 liters of cyclohexane. 16 grams of iodine are then added and the whole is refluxed for one hour. 10 grams of $\Delta^5$-3-ethylenedioxy-11$\alpha$-acetoxy - 20$\beta$ - hydroxy-pregnene are then added and the suspension is refluxed for 4 hours, cooled to room temperature and suction-filtered. The residue is thoroughly washed with ether. The filtrate is washed at 0° C. with sodium thiosulfate solution and water, dried and the whole is then poured into 30 grams of anhydrous sodium acetate and 10 cc. of dimethyl formamide, and the solution is concentrated in vacuo. The residual dimethyl formamide solution is diluted with 100 cc. of dimethyl formamide and heated for 2 hours on a boiling water bath. The dimethyl formamide solution is then considerably concentrated in vacuo at about 90–95° C., cooled and diluted with water. The residue is taken up in ether and the ethereal solution is washed with water, dried, filtered through a column of 100 grams of alumina, and the column is rinsed with ether. Evaporation of the ethereal solution yields 11.3 grams of crude $\Delta^5$ - 3 - ethylenedioxy - 11$\alpha$,18 - diacetoxy - 18,20 - oxido-pregnene.

The resulting crude diacetate is treated with 10 grams of potassium carbonate, 100 cc. of water and 400 cc. of methanol and the solution is refluxed for 1 hour; water is then added and the methanol is distilled off in vacuo and the residue is agitated with ether. The ethereal solution is washed with water, dried and evaporated. The residue is crystallized from about 50 cc. of freshly distilled isopropyl ether. The crystals are suctioned off, thoroughly washed with isopropyl ether and dried. Concentration of the mother liquors yields a further amount of crystal. Total yield: 6.2 grams of $\Delta^5$-3-ethylenedioxy-11$\alpha$-acetoxy-18-hydroxy-18,20-oxido-pregnene melting at 202–208° C. When the mother liquors (4–5 grams) are chromatographed on 120 grams of alumina and elution with ether is performed, a further amount of this compound can be obtained.

A solution of 6 grams of this monoacetate in 48 cc. of pyridine is treated at 0° C. with a chromic acid solution prepared at 0° C. from 12 grams of chromium trioxide, 24 cc. of water and 24 cc. of pyridine. The solution is stirred for 20 hours at 30° C., treated with ice, 100 cc. of ethyl acetate and a solution of 40 grams of sodium thiosulfate in 80 cc. of water. The brown suspension is extracted with ethyl acetate. The ethyl acetate solutions are repeatedly washed with sodium carbonate solution of about 0.5 N-strength and with water, dried and evaporated in vacuo. The crystalline residue is easy to recrystallize from a mixture of methylene chloride and ether containing a trace of pyridine, to yield 5 grams of the 18,20-lactone of $\Delta^5$-3-ethylenedioxy-11$\alpha$-acetoxy-20$\beta$-hydroxy-pregnene-18-acid melting at 235–247° C. Chromatography of the mother liquors on 60 grams of alumina yields from the benzene fractions a further amount of this lactone.

When 725 mg. of $\Delta^5$-3-ethylenedioxy-20$\alpha$-hydroxy-pregnene are treated in a completely analogous manner with lead tetraacetate and iodine as described above there are obtained, via the $\Delta^5$-3-ethylenedioxy-18-iodo-18,20$\alpha$-oxido-pregnene, 610 mg. of $\Delta^5$-3-ethylenedioxy-18-hydroxy-18,20$\alpha$-oxido - pregnene. $\Delta^5$-3-ethylenedioxy-20$\alpha$-hydroxy-pregnene is prepared by reducing the progesterone mono-ketal sodium and alcohol and purification by chromatography on alumina. $\Delta^5$-3-ethylenedioxy-20$\alpha$-hydroxy-pregnene melts at 175–178° C. Optical rotation $[\alpha]_D = -43°$ (in chloroform).

*Example 13*

6 grams of lead tetraacetate are dried for 30 minutes in a water-jet vacuum and then for 30 minutes in a high vacuum. 2 grams of calcium carbonate and 200 cc. of cyclohexane are added, and the whole is heated with stirring to the boil, treated with 1.6 grams of iodine and refluxed for a further hour. The boiling solution is then treated with 1 gram of $\Delta^{5:9:11}$-3-ethylenedioxy-20$\beta$-hydroxy-pregnadiene, rinsed with 12 cc. of cyclohexane and then stirred for another 4 hours, cooled, filtered and rinsed with absolute ether. The filtrate is washed with an ice-cold solution of 5 grams of sodium thiosulfate in 20 cc. of water and three times with water, and the aqueous solutions are then agitated twice with ether. The combined organic solutions are evaporated in a flask containing 3 grams of sodium acetate and 3 grams of glacial acetic acid in a water-jet vacuum at a bath temperature of 50° C., treated with 30 cc. of acetic acid of 80% strength, heated for 2 hours on the boiling water bath, cooled and evaporated almost to dryness in a water-jet vacuum. Ether is added and the whole is washed with water, 2 N-sodium carbonate solution and water, dried and again evaporated in a water-jet vacuum. A solution of the residue, which contains $\Delta^{4:9:11}$-3-oxo-18-hydroxy-18,20-oxido-pregnadiene, in 6 cc. of pyridine is added to a solution of 1.5 grams of chromium trioxide in 3 cc. of water and 3 cc. of pyridine. The whole is kept for 20 hours at room temperature, mixed with 20 grams of ice, then slowly treated with 10 cc. of a sodium bisulfite solution of 40% strength and 10 minutes later with 2 N-hydrochloric acid until an acid reaction to Congo red has been established. The reaction mixture is then extracted with ethyl acetate and the ethyl acetate solution is washed with 2 N-sodium carbonate solution and water. The organic solution is dried and evaporated and the residue is chromatographed on 40 grams of silica gel containing 15% of water. The fractions eluted with a 19:1-mixture of benzene and ethyl acetate yield the 18:20-lactone of $\Delta^{4:9:11}$-3-oxo-20$\beta$-hydroxypregnadiene - 18 - acid described in Example 8, which melts at 205–210° C. after crystallization from methylene chloride+ether.

The fraction eluted with a 9:1-mixture of benzene and ethyl acetate yield a substance which still contains an acetoxy group. It probably has the structure of the 18,20-lactone of $\Delta^{4:9:11}$ - 3 - oxo - 12-acetoxy-20$\beta$-hydroxy-pregnadiene-18-acid.

A solution of 500 mg. of the 18,20-lactone of $\Delta^{4,9,11}$-3-oxo-20β-hydroxy-pregnadiene-18-acid in 10 cc. of pure dioxane is treated with 2 cc. of water and then with 300 mg. of N-bromosuccinimide and 1 cc. of perchloric acid of 10% strength. The mixture is stirred for 15 minutes at room temperature, the excess hypobromous acid is destroyed by adding sodium sulfite solution, and the whole is poured into 75 cc. of ice water. The resulting precipitate is taken up in methylene chloride and the solution is dried and evaporated. The residue consists of the crude 18,11-lactone of $\Delta^4$-3-oxo-9α-bromo-11β,20β-dihydroxy-pregnene-18-acid which is purified by chromatography on silica gel.

Oxidation of 222 mg. of the crude product in 3 cc. of glacial acetic acid with 200 mg. of chromium trioxide and 0.2 cc. of water for 4 hours, yields the 18,11-lactone of $\Delta^4$-3,20-dioxo-9α-bromo-11β-hydroxypregnene-18-acid.

Ketalization of the 18,11-lactone of $\Delta^4$-3-oxo-9α-bromo - 18β,20β - dihydroxy-pregnene - 18-acid (as described in Example 6) with ethylene glycol and para-toluenesulfonic acid in benzene, yields the 18,11-lactone of $\Delta^5$ - 3 - ethylene-dioxy-9α-bromo-11β,20β-dihydroxy-pregnene-18-acid which, as described in Example 6, for the bromine-free compound, is oxidized with chromium trioxide+pyridine to form the 18,11-lactone of $\Delta^5$-3-ethylenedioxy - 9α-bromo-11β-hydroxy-20-oxo-pregnene-18-acid.

*Example 14*

6 grams of lead tetraacetate are dried for 30 minutes in a water-jet vacuum and then for 30 minutes in a high vacuum. 2 grams of calcium carbonate and 200 cc. of cyclohexane are added and the mixture is heated with stirring to the boil, then treated with 1.6 grams of iodine and refluxed for a further hour. The boiling solution is then treated with 1 gram of $\Delta^5$ - 3 - ethylenedioxy - 11α-acetoxy - 20β - hydroxy - pregnene, rinsed with 12 cc. of cyclohexane, boiled for another 4 hours with stirring, cooled, filtered and washed with absolute ether. The filtrate is washed with an ice-cold solution of 5 grams of sodium thiosulfate in 20 cc. of water and three times with water, and the aqueous solutions are then agitated twice with ether. The combined organic solutions are evaporated in a water-jet vacuum at a bath temperature of 24° C., whereupon a pale yellow oil is left which contains $\Delta^5$ - 3 - ethylenedioxy - 11α - acetoxy-18-iodo-18,20-oxido-pregnene; this product is further worked up in the following manner:

A mixture of 1 gram of chromium trioxide, 2 grams of silver chromate and 10 cc. of water is stirred for 3 hours at room temperature and while cooling with ice 10 cc. of pyridine are added. After about 30 minutes the content of the flask has turned thickly liquid and pale orange. The solution of the above-mentioned oil in 10 cc. of pyridine is then added and the whole is stirred for 25 hours at room temperature and for 41 hours at 40° C., then treated with ether and dilute sodium chloride solution, filtered, rinsed with ether, and the organic phase is washed three times with water. The aqueous solutions are then extracted twice with ether and the organic solutions are combined, dried and evaporated in a water-jet vacuum. To free it from pyridine, the residue is dissolved in benzene, once more evaporated in a water-jet vacuum and this operation is repeated once more. The residue is chromatographed on 40 grams of silica gel containing 15% of water. The crystalline fractions eluted with a 19:1-mixture of benzene and ethyl acetate are recrystallized from methylene chloride+ether and yield 173 mg. of the 18,20-lactone of $\Delta^5$-3-ethylenedioxy - 11α - acetoxy-20β-hydroxy-pregnene-18-acid described in Example 12. The mixed melting point test reveals no depression of the melting point, and the infra-red spectra are likewise identical.

When the reaction solution is irradiated with a 500-watt lamp during the oxidation with lead tetraacetate, the solution loses its color after about 2 hours after addition of the 20-hydroxy-pregnene. As soon as the reaction product has lost its color completely it is worked up as described above and can then be oxidized with chromium trioxide+silver chromate.

In a fully analogous manner $\Delta^5$-3-ethylenedioxy-20β-hydroxy-pregnene is converted into the 18,20-lactone of $\Delta^5$-3-ethylenedioxy-20β-hydroxy-pregnene-18-acid melting at 220–225° by lead tetraacetate-iodine treatment followed by oxidation with chromium trioxide-silver chromate. By splitting the ethylene ketal group in the usual way the 18,20-lactone of $\Delta^4$-3-oxo-20β-hydroxy-pregnene-18-acid is formed which melts at 208–210°. After treating this compound in known manner with selenium dioxide the 18,20-lactone of $\Delta^{1,4}$-3-oxo-20β-hydroxy-pregnadiene-18-acid, melting at 240–243° is isolated.

*Example 15*

1.59 grams of the 18,20-lactone of $\Delta^4$-3-oxo-11α-acetoxy-20β-hydroxy-pregnene-18-acid described in Example 7 in 100 cc. of benzene are treated with 16 cc. of ethylene glycol and 80 mg. of para-toluenesulfonic acid, and the whole is refluxed for 8 hours at a bath temperature of 130° C. with the use of a water separator, then diluted with benzene, washed with sodium bicarbonate solution until neutral, and the benzene solution is dried and evaporated in vacuo. Crystallization of the residue from methylene chloride+ether yields 1.585 grams of the 18,20-lactone of $\Delta^5$-3-ethylenedioxy-11α-acetoxy-20β-hydroxy-pregnene-18-acid melting at 235–238° C. Optical rotation $[\alpha]_D = -34°$ (in chloroform). Infra-red spectrum: bands at 5.68μ (γ-lactone), 5.76μ (acetate), 9.01 and 9.15μ (ketal).

A solution of 939 mg. of this 11α-acetoxy-3-ketal in 100 cc. of methanol is treated with 1.0 gram of potassium carbonate in 10 cc. of water and refluxed for 4 hours under nitrogen. The reaction mixture is then cooled, concentrated in a water-jet vacuum to about 20 cc. and repeatedly extracted with methylene chloride. The extracts are washed first with water containing 7 cc. of 2 N-acetic acid and then with plain water. The dried methylene chloride extracts yield 900 mg. of the crystalline, crude 18:20-lactone of $\Delta^5$-3-ethylenedioxy-11α, 20β-dihydroxy-pregnene-18-acid which melts at 199–202° C. after having been crystallized from methylene chloride+ether. Optical rotation $[\alpha]_D = -25.5°$ (in chloroform). Infra-red spectrum: bands at 2.75 and 2.85μ (hydroxyl free and associated), 5.68μ (γ-lactone), 9.05 and 9.13μ (ketal).

A solution of 500 mg. of the above 11α-hydroxy-lactone in 3.0 cc. of pyridine is treated with 500 mg. of para-toluene-sulfonyl chloride and kept for 2 days at room temperature. The mixture is then poured into 30 cc. of water, the resulting crystal lumps are squashed, suction-filtered and the residue is copiously washed with water. Crystallization from methylene chloride+ether yields 633 mg. of the pure 18,20-lactone of $\Delta^5$-3-ethylenedioxy-11α-tosyloxy-20β-hydroxy-pregnene-18-acid melting at 139–141° C. (with decomposition). Optical rotation $[\alpha]_D = -38.5°$ (in chloroform). Infra-red spectrum: bands at 5.69μ (γ-lactone), 6.24, 8.44 and 8.54μ (tosylate) and 9.02/9.14μ (ketal). Ultra-violet spectrum: maximum at 226mμ ($\epsilon=13150$).

A solution of 340 mg. of this tosylate in 5 cc. of a 10% solution of lithium chloride in dimethyl formamide is treated with 500 mg. of finely powdered lithium carbonate and stirred for 4 hours at 100° C. under nitrogen. The reaction mixture is then poured into water and the precipitate is suctioned off and thoroughly washed with water. The resulting 18,20-lactone of $\Delta^{5,9,11}$-3-ethylenedioxy-20β-hydroxy-pregnadiene-18-acid melts at 193–200° C. after having been crystallized from methylene chloride+ether+hexane.

Example 16

A solution of 240 mg. of the 18,20-lactone of $\Delta^4$-3-oxo-11$\alpha$,20$\beta$-dihydroxy-pregnene-18-acid in 3 cc. of methylene chloride is treated with 1.0 cc. of pyridine and 300 mg. of para-toluenesulfonyl chloride and kept for 3 days at room temperature. The reaction mixture is then diluted with methylene chloride and washed with dilute sulfuric acid and with water. Crystallization of the residue of the methylene chloride solution from methylene chloride +ether yields 255 mg. of the 18,20-lactone of $\Delta^4$-3-oxo-11$\alpha$-tosyloxy-20$\beta$-hydroxy-pregnene-18-acid melting at 142–144° C. (with decomposition). Optical rotation $[a]_D= +48°$ (in chloroform). Ultra-violet spectrum: absorption maximum at 229 m$\mu$ ($\epsilon$=24800). Infra-red spectrum: bands at 5.69$\mu$ ($\gamma$-lactone), and 5.96 and 6.17$\mu$ ($\Delta^4$-3-ketone), 6.24, 8.44 and 8.54$\mu$ (tosylate).

170 mg. of the 18,20-lactone of ($\Delta^4$ - 3 - oxo - 11$\alpha$-tosyloxy - 20$\beta$ - hydroxy - pregnene - 18 - acid in 5 cc. of a 10% solution of lithium chloride in dimethyl formamide is stirred for 4 hours at 100° C. under nitrogen, then poured into 50 cc. of water and the solid precipitate is suctioned off and thoroughly rinsed with water. Yield: 120 mg. of the 18,20-lactone of $\Delta^{4,9:11}$-3-oxo-20$\beta$-hydroxy-pregnadiene-18-acid which melts at 205–210° C. after having been crystallized from a mixture of methylene chloride and ether and sublimed at 180° C. under a pressure of 0.05 mm. Hg. Optical rotation $[a]_D= +16°$ (in chloroform). Ultra-violet spectrum: maximum at 239 m$\mu$ ($\epsilon$=16850). Infra-red spectrum: bands at 5.68$\mu$ (5-ring lactone), 5.98 and 6.17$\mu$ ($\Delta^4$-3-ketone), and at 7.42, 8.15, 8.68, 9.10 and 9.85$\mu$. The compound is identical with the compound described in Example 13.

Example 17

A mixture of 1.0 gram of anhydrous calcium carbonate and 3.0 grams of anhydrous lead tetraacetate in 100 cc. of dimethyl-cyclohexane is heated to 80° C., treated with 800 mg. of iodine and stirred for almost one hour at 80° C. 500 mg. of $\Delta^5$-3-ethylenedioxy-11$\alpha$-acetoxy-20$\beta$-hydroxy-pregnene are then added and the whole is stirred for 4 hours at a bath temperature of 150° C., then cooled, filtered, and the filtrate is worked up as described in Example 6. 1.5 grams of sodium acetate and 5 cc. of glacial acetic acid are added, the whole is evaporated, then heated for 2 hours at 100° C. with 20 cc. of glacial acetic acid of 80% strength and worked up. Oxidation of the resulting crude product (790 mg.) with chromium trioxide in aqueous pyridine as described in Example 6 yields 474 mg. of a crude product which, after having been filtered through 5 grams of alumina, yields 160 mg. of the 18,20 - lactone of $\Delta^4$ - 3 - oxo - 11$\alpha$ - acetoxy - 20$\beta$-hydroxy-pregnene-18-acid melting at 186–187° C.

Example 18

6.0 grams of lead tetraacetate containing acetic acid are dissolved in a water-jet vacuum, dried under 0.1 mm. Hg pressure and then added to a suspension of 2.0 grams of anhydrous calcium carbonate in 200 cc. of cyclohexane. The compound is heated to the boil, treated with 1.6 grams of iodine and refluxed for one hour. 1.0 gram of $\Delta^5$-3-ethylene-dioxy-9-11$\beta$-oxido-20$\beta$-hydroxy-pregnene is then added and the solution is boiled for another three hours while being irradiated with a 500-watt lamp. In the course of the reaction the solution becomes completely colorless. The reaction solution is cooled, the insoluble salts are filtered off and the residue is thoroughly rinsed with ether. The filtrate is washed with sodium thiosulfate solution and water, and evaporated in a water-jet vacuum at a bath temperature of 25–30° C. A solution of the residue in 10 cc. of pyridine is added to a mixture which has been stirred for one hour and cooled to 0° C. of 1.0 gram of chromium trioxide, and 2.0 grams of silver chromate in 10 cc. of water and 10 cc. of pyridine. The reaction mixture is then stirred for 48 hours at 40° C., cooled and treated with ether and dilute sodium chloride solution. The insoluble salts are then filtered off, and the organic layer is separated and repeatedly extracted with ether. The extracts are washed with water, dried and evaporated in a water-jet vacuum. The residue (1.07 grams) is chromatographed on silica gel. Mixtures of benzene and ethyl acetate elute the pure 18,20-lactone of $\Delta^5$ - 3 - ethylene-dioxy-9,11$\beta$-oxido-20$\beta$-hydroxy-pregnene-18-acid.

A solution of 250 mg. of the 18,20-lactone of $\Delta^5$-3-ethylenedioxy-9,11$\beta$-oxido-20$\beta$-hydroxy - pregnene-18-acid in 1.5 cc. of methylene chloride is slowly added to a mixture cooled to −60° C. of 10.3 cc. of tetrahydrofuran, 3.6 cc. of methylene chloride and 5.0 cc. of anhydrous hydrofluoric acid. After completion of the addition the mixture is kept for 15 minutes at −60° C., then for 3 hours at 0° C., and then poured into a cold solution of sodium bicarbonate. The mixture is then extracted with methylene chloride and the extracts are washed with water, dried and evaporated. The residue (240 mg.) is filtered through 12 grams of silica gel. The 18,11-lactone of $\Delta^4$-3-oxo-9$\alpha$-fluoro-11$\beta$-20$\beta$-dihydroxy-pregnene-18-acid is eluted with mixtures of benzene and ethyl acetate and then with ethyl acetate.

A solution of 105 mg. of this compound in 2 cc. of glacial acetic acid is treated with 200 mg. of chromium trioxide in 0.5 cc. of water and kept for 5 hours at 25° C. Usual working up yields a crude product from which the pure 18,11-lactone of $\Delta^4$-3,20-dioxo-9$\alpha$-fluoro-11$\beta$-hydroxy-pregnene-18-acid is obtained by crystallization from methylene chloride+ether.

A solution of 285 mg. of the 18,11-lactone of $\Delta^4$-3-oxo-9$\alpha$-fluoro-11$\beta$,20$\beta$-dihydroxy-pregnane-18-acid in 100 cc. of benzene is treated with a solution of 20 mg. of para-toluene-sulfonic acid in 10 cc. of ethylene glycol and refluxed for 6 hours with the use of a water separator, then cooled, treated while being stirred with 20 cc. of saturated sodium bicarbonate solution and diluted with 50 cc. of benzene. The organic solution is separated, washed with water and dried and evaporated in a water-jet vacuum. The resulting crude 18,11-lactone of $\Delta^5$-3-ethylenedioxy-9$\alpha$-fluoro-11$\beta$,20$\beta$-dihydroxy-pregnene-18-acid is oxidized, as described in Example 6 for the non-fluorinated compound, with chromium trioxide in pyridine for 15 hours at 60° C. The resulting crude oxidation product is purified by chromatography on silica gel. The fractions eluted with mixtures of benzene and ethyl acetate yield on crystallization from ether+methylene chloride the pure 18,11-lactone of $\Delta^5$-3-ethylenedioxy-9$\alpha$-fluoro-11$\beta$-hydroxy-20-oxo-pregnene-18-acid.

When the splitting up is performed with a solution of hydrogen chloride in methanol instead of with anhydrous hydrofluoric acid, the 18,11-lactone of $\Delta^4$-3-oxo-9$\alpha$-chloro-11$\beta$,20-dihydroxy-pregnene-18-acid is obtained which is converted into the 18,11-lactone of $\Delta^4$-3,20-dioxo-9$\alpha$-chloro-11$\beta$-hydroxy-pregnene-18-acid and of $\Delta^5$-3-ethylenedioxy-9$\alpha$-chloro-11$\beta$-hydroxy - 20-oxo - pregnene-18-acid respectively, as described above for the 9-fluoro compound.

Example 19

7.2 grams of iodine are added to a stirred suspension, heated at 80° C., of 26 grams of anhydrous lead tetraacetate and 8.8 grams of calcium carbonate in 1.2 liters of cyclohexane, and the violet mixture is refluxed for one hour, then cooled to about 60° C.; 3.80 grams of $\Delta^4$-3-oxo-11$\alpha$-acetoxy-20$\beta$-hydroxy-pregnene are added and the whole is boiled for 4 hours with stirring by heating with a reflector burner. The cooled colorless reaction mixture is filtered, rinsed with ether and the filtrate is agitated once with a solution of 20 grams of sodium thiosulfate in 80 cc. of water and then three times with water. Without drying the solution, it is evaporated in vacuo in a flask containing 12 grams of sodium acetate and 12 cc. of glacial acetic acid, and the residue is treated with 120 cc. of acetic acid of 80% strength and then heated for 2 hours at 100° C. The reddish reaction mixture is treated with 20 cc. of water and evaporated in vacuo. The residue is taken up in ether+water, washed with sodium bicarbonate solution and water until neutral, dried and evaporated.

For the purpose of the oxidation the residue is dissolved in 24 cc. of pyridine and treated at 0° C. with a solution of 6 grams of chromium trioxide in 12 cc. of water and 12 cc. of pyridine. The mixture is kept for 18 hours at 20° C., treated with about 100 grams of ice and 40 cc. of sodium bisulfite solution of 40% strength, kept for 15 minutes, acidified with dilute hydrochloric acid, extracted with ether+methylene chloride, washed with sodium bicarbonate and water until neutral, dried and evaporated. The resulting oil crystallizes when sprinkled and yields 1.02 grams of the crude 18,20-lactone of $\Delta^4$-3-oxo-11α-acetoxy-20-hydroxy-pregnene-18-acid which melts unsharply at 155–165° C.; infra-red spectrum is identical with that of the product described in Example 7. The mother liquor yields a further amount of the same product.

*Example 20*

A suspension of 1 gram of calcium carbonate and 3 grams of lead tetraacetate (dried for ½ hour in a water-jet vacuum and then for ½ hour in a high vacuum) in 100 cc. of cyclohexane is boiled for a short time and 0.800 gram of iodine is added. The mixture is heated for one hour at 80° C. and 490 mg. of $\Delta^5$-3-ethylenedioxy-11-oxo-20β-hydroxy-pregnene are added. The reaction mixture is stirred on for 4 hours at 80° C. and then filtered. The filter residue is washed with ether and the filtrate is washed with a solution of 2.5 grams of sodium thiosulfate in 10 cc. of water and three times with water. The organic solution is evaporated in vacuo in a flask containing 1.5 grams of sodium acetate and 1.5 cc. of acetic acid. The residue is treated with 15 cc. of acetic acid of 80% strength and heated for 2 hours at 100° C., the solvent is evaporated in vacuo and the residue is worked up as described in Example 19. There are obtained 455 mg. of a yellowish oil which is oxidized with 750 mg. of chromium trioxide in 4.5 cc. of pyridine and 1.5 cc. of water as described. Usual working up yields 365 mg. of an oil which does not crystallize; when it is chromatographed on neutral alumina it yields 224 mg. of a product which crystallizes when sprinkled. Recrystallization yields 91 mg. of the 18,20-lactone of $\Delta^4$-3,11-dioxo-20β-hydroxy-pregnene-18-acid melting at 228–234° C. The mother liquor contains a further amount of about 40 mg. of the identical product.

In an identical manner there are obtained from 960 mg. of $\Delta^5$-3-ethylenedioxy-11-oxo-20α-hydroxy-pregnene 395 mg. of the 18,20-lactone of $\Delta^4$-3,11-dioxo-20α-hydroxy-pregnene-18-acid which melts at 257° C. after having been crystallized from methylene chloride+ether. Optical rotation $[\alpha]_D = +140°$ (in chloroform).

*Example 21*

A mixture of 9.0 grams of lead tetraacetate, 3.0 grams of calcium carbonate and 270 cc. of cyclohexane is heated to the boil with stirring and under exclusion of water, 2.4 grams of iodine are then added and the whole is refluxed for one hour. 1.5 grams of $\Delta^5$-3-ethylenedioxy-11α-acetoxy-20β-hydroxy-19-nor-pregnene are then added and while stirring continuously and irradiating with a 250-watt lamp the whole is boiled until the color of iodine has completely disappeared. The reaction mixture is cooled to 20° C., filtered and the filter residue is washed with ether. The filtrate is washed with cold sodium thiosulfate solution and with water, the organic solution is dried and 4.5 grams of anhydrous sodium acetate and 15 cc. of dimethyl formamide are added, and the readily volatile solvents are distilled off in a water-jet vacuum. The residual dimethyl formamide solution is treated with a further 15 cc. of dimethyl formamide and heated for 2 hours at 100° C., evaporated in a water-jet vacuum, cooled, diluted with water and the precipitate formed is taken up in ether. The ethereal extract is washed with water and filtered-through a column of 15 grams of alumina, thoroughly washed with ether and the filtrate is evaporated to dryness, to yield 1.6 grams of crude $\Delta^5$-3-ethylenedioxy-11α,18-diacetoxy-18,20-oxido-19-nor-pregnene. The crude product is dissolved in 60 cc. of methanol, treated with a solution of 3.0 grams of potassium carbonate in 20 cc. of water and refluxed for 3 hours under nitrogen. Another 20 cc. of water are added, the methanol is evaporated in a water-jet vacuum and the residue is repeatedly extracted with methylene chloride. On evaporation, the dried extracts yield 1.4 grams of a pale-yellow residue containing as the main product $\Delta^5$-3-ethylenedioxy-11α,18-dihydroxy-18,20-oxido-19-nor-pregnene.

This crude product is dissolved in 7 cc. of pyridine and the solution is added to a mixture of 1.8 grams of chromum trioxide in 3.6 cc. of water and 3.6 cc. of pyridine. The reaction mixture is stirred for 20 hours at 30° C., treated with 50 cc. of water and repeatedly extracted with ethyl acetate. The extracts are thoroughly washed with water, dried and evaporated. The residue is dissolved in benzene and filtered through a column of 30 grams of silica gel. Benzene+ethyl acetate mixtures elute 512 mg. of the pure 18,20-lactone of $\Delta^5$-3-ethylenedioxy-11-oxo-20-hydroxy-19-nor-pregnene-18-acid.

As described in Example 7 for the corresponding substituted 10-methyl compound, this lactone is reduced with sodium borohydride and the resulting 18,11-lactone of $\Delta^5$-3 - ethylenedioxy - 11β,20 - dihydroxy - 19 - nor-pregnene-18-acid is oxidized with chromic acid to form the 18,11-lactone of $\Delta^5$-3-ethylenedioxy-11β-hydroxy-20-oxo-19-nor-pregnene-18-acid. This compound can be split up to form the 18,11-lactone of $\Delta^4$-3,20-dioxo-11β-hydroxy-19-nor-pregnene-18-acid by treatment with dilute acetic acid for 10 minutes at 100° C., or the 18,11-lactone of the $\Delta^5$-3-ethylenedioxy - 11β - hydroxy - 20 - oxo - 19 - nor-pregnene-18-acid can be converted into the 19-nor-aldosterone as described in the case of the conversion of the 18,11-lactone of $\Delta^5$-3-ethylenedioxy-11β-hydroxy-20-oxo-pregnene-18-acid into aldosterone.

*Example 22*

30 grams of lead tetraacetate dried in a water-jet vacuum are boiled in 1000 cc. of cyclohexane with 10 grams of dry calcium carbonate for 1 hour with stirring. 8.0 grams of iodine and 10.0 grams of 3β,11α-diacetoxy-20β-hydroxy-5α-pregnane melting at 165–166° C. are then added, and the whole is boiled with stirring for 100 minutes while irradiating with a 500-watt lamp. After cooling, any undissolved salts are filtered off, the residue washed with cyclohexane, the filtrate extracted with sodium thiosulfate solution and with water and, after the addition of 2.5 cc. of pyridine, the reaction product is evaporated to dryness in a water-jet vacuum.

The resulting crude product which contains 3β,11α-diacetoxy-18-iodo-18,20-oxido-5α-pregnane is dissolved in 200 cc. of acetone. 5.0 grams of silver chromate are added to the solution, the whole is stirred for 30 minutes at room temperature and cooled to 0–5° C. A mixture of 13.6 grams of chromium trioxide and 11.5 cc. of concentrated sulfuric acid is diluted with water to make 50 cc., and 11.8 cc. of this solution are added to the reaction mixture in the course of 5 minutes. After stirring for 60 minutes at 0–5° C. a solution of 112 grams of crystalline sodium acetate in 200 cc. of water are added, the solution is diluted with benzene, any undissolved salts are filtered off and the aqueous layer separated. The latter is extracted once again with benzene and the organic solutions are washed with half-saturated sodium chloride solution. From the dried organic solution there are obtained 11.14 grams of a crystalline crude product; from the latter there may be isolated by crystallization from ether 7.15 grams of pure 18,20-lactone of 3β,11α-diacetoxy-20β-hydroxy - 5α-pregnane-18-acid melting at 216–218° C. Optical rotation: $[\alpha]_D = -24°$ (in chloroform);

infrared bands, inter alia at 5.69μ (γ-lactone); 5.77μ (acetate); 7.26μ, 7.32μ, 8.12μ, 8.78μ, 9.75μ and 10.44μ.

23.8 grams of the 18,20-lactone of 3β,11α-diacetoxy-20β-hydroxy-5α-pregnane-18-acid are refluxed for 10 hours in 1150 cc. of methanol with a solution of 23.32 grams of potassium carbonate in 115 cc. of water. After cooling, 38 cc. of glacial acetic acid are added and the reaction mixture is evaporated to dryness in a water-jet vacuum. The solid residue is stirred with water, filtered with suction and the resulting crude 18,20-lactone of 3β,11α,20β-trihydroxy - 5α-pregnane-18-acid (about 20 grams) is washed thoroughly with water. Recrystallization of the crude product from a mixture of methylene chloride and ether and a mixture of acetone and ether yields the pure lactone which melts at 218–220° C.; optical rotation $[\alpha]_D = -18°$ (in chloroform). Infrared bands inter alia at 2.78μ (OH), 5.70μ (γ-lactone), 7.26μ, 7.34μ, 7.43μ, 8.80μ, 9.70μ and 10.48μ.

19 grams of the moist 18,20-lactone of 3β,11α,20β-trihydroxy-5α-pregnane-18-acid are dissolved in 300 cc. of methylene chloride and, after the addition of 5 cc. of pyridine, 10.0 grams of N-bromacetamide and 0.05 cc. of hydrogen peroxide of 30% strength, the whole is stirred for 6 hours at 20–25° C. A solution of 5.0 grams of sodium bisulfite in 100 cc. of water is then added, the mixture is diluted with methylene chloride and washed several times with water. The dried methylene chloride solution is dried and evaporated to yield a crystalline residue which is recrystallized from a mixture of ether and hexane to yield 14.2 grams of the pure 18,20-lactone of 3-oxo-11α,20β-dihydroxy-5α-pregnane-18-acid melting at 213–214° C.; optical rotation $[\alpha]_D = -5°$ (in chloroform). Infrared bands inter alia at 2.77μ (OH), 5.69μ (γ-lactone), 5.83μ (3-ketone), 7.24μ, 7.41μ, 8.17μ, 8.80μ, 9.90μ and 10.50μ.

In the course of crystallization from methanol the compound very readily takes up the solvent and forms extremely easily with anhydrous methanol with traces of acid a 3-dimethyl-ketal in whose infrared spectrum the band at 5.83μ is missing.

When 899 mg. of the 18,20-lactone of 3β,11α,20β-trihydroxy-5α-pregnene-18-acid in 30 cc. of acetone are oxidized with 1.5 cc. of the above described chromium trioxide-sulfuric acid solution for 15 minutes at 0° C., there are obtained after working up in the ordinary manner 842 mg. of a crystalline crude product which is crystallized from a mixture of methylene chloride and ether to yield 680 mg. of the pure 18,20-lactone of 3,11-dioxo-20β-hydroxy-5α-pregnene-18-acid melting at 261–263° C.; optical rotation $[\alpha]_D = +27°$; infrared spectrum: bands inter alia at 5.68μ, 5.83μ, 7.43μ, 8.78μ and 9.02μ.

14.08 grams of the 18,20-lactone of 3-oxo-11α,20β-dihydroxy-5α-pregnane-18-acid are dissolved in 80 cc. of pyridine and, after the addition of 80 cc. of acetic anhydride, the whole is allowed to stand for 2 days at 20–25° C. It is then evaporated to dryness in a waterjet vacuum, toluene is added and the mixture is again evaporated. The residue is crystallized from a mixture of ether and hexane to yield 13.2 grams of the pure 18,20-lactone of 3-oxo-11α-acetoxy - 20β-hydroxy - 5α-pregnane - 18-acid melting at 181–183° C.; optical rotation $[\alpha]_D = -12°$ (in chloroform). Infrared bands inter alia at 5.70μ (γ-lactone), 5.77μ (acetate), 5.84μ (3-ketone), 7.30μ, 8.12μ, 8.12μ, 8.80μ, 9.80μ and 10.50μ.

1.0 grams of the 18,20-lactone of 3-oxo-11α-acetoxy-20β-hydroxy-5α-pregnane-18-acid is dissolved in 10 cc. of glacial acetic acid, and 2.8 cc. of an 0.955-molar bromine solution in glacial acetic acid are added with stirring at 20–25° C. in the course of 10 minutes. When the addition is complete the whole is stirred for a further 10 minutes and the colorless reaction mixture is poured into 200 cc. of water, the crystalline precipitate is suction-filtered and washed thoroughly with water. The dried crude product is recrystallized from ether to yield 1.01 grams of the 18,20-lactone of 2-bromo-3-oxo-11α-acetoxy-20β-hydroxy-5α-pregnane-18-acid melting at 195–196° C. (with decomposition); optical rotation $[\alpha]_D = +20°$ (in chloroform); infrared bands inter alia at 5.70μ (γ-lactone), 5.77μ (acetate and 3-ketone); 7.27μ, 8.14μ, 8.80μ, 9.80μ, 10.38μ and 10.41μ.

907 mg. of crystalline 18,20-lactone of 2-bromo-3-oxo-11α-acetoxy-20β-hydroxy-5α-pregnane-18-acid are heated in a solution of lithium chloride of 10% strength in dimethylformamide for 12 hours at 100° C. under nitrogen. The reaction mixture is cooled, poured into 150 cc. of water and extracted with methylene chloride. The extracts are washed several times with water and then dried and evaporated to yield 862 mg. of a crude product, which crystallizes easily with ether, which is purified by chromatography on 25 grams of aluminum oxide. The first benzene fraction contains 211 mg. of pure 18,20-lactone of 2-bromo-3-oxo - 11α-acetoxy - 20β-hydroxy-5α-pregnane-18-acid. The following fractions contain mixtures of 2-bromide and unsaturated compounds whilst from the fractions eluted with a mixture of benzene and ethyl acetate (9:1) 150 mg. of pure 18,20-lactone of Δ⁴-3-oxo - 11α-acetoxy - 20β-hydroxy-pregnene - 18-acid melting at 184–186° C. are isolated. The compound is identical with the compound described in Example 4.

The 3β,11α-diacetoxy-20β-hydroxy-5α-pregnane used as starting material in this example is obtained by reducing the corresponding 20-ketone with lithium-tri-tertiary butoxy-aluminum hydride in tetrahydrofuran.

*Example 23*

10.0 grams of 3α,11α-diacetoxy-20β-hydroxy-5β-pregnane melting at 155–156° C. (optical rotation $[\alpha]_D = -5°$ in chloroform; prepared by catalytic hydrogenation of the corresponding 20-ketone with platinum in glacial acetic acid) are reacted with 30 grams of lead tetra-acetate, 10 grams of calcium carbonate and 8.0 grams of iodine in 1000 cc. of cyclohexane, and the crude 3α,11α-diacetoxy-18-iodo-18,20-oxido-5β-pregnane is then oxidized with silver chromate and chromic acid-sulfuric acid in acetone in the manner described in Example 22; after crystallization of the reaction product from ether there are obtained 7.42 grams of pure 18,20-lactone of 3α,11α-diacetoxy-20β-hydroxy-5β-pregnane-18-acid melting at 226–229° C.; optical rotation $[\alpha]_D = 0°$ (in chloroform); infrared bands inter alia at 5.71μ (γ-lactone); 5.79μ (acetate), 7.29μ, 7.36μ, 8.14μ, 8.79μ, 9.78μ and 10.35μ.

6.397 grams of the 18,20-lactone of 3α,11α-diacetoxy-20β-hydroxy-5β-pregnane-18-acid are boiled for 10 hours under reflux in 320 cc. of methanol after adding 6.4 grams of potassium carbonate in 32 cc. of water. After cooling, 10 cc. of glacial acetic acid are added, the reaction mixture is concentrated in a water-jet vacuum until crystals precipitate in quantity, diluted with 300 cc. of water, the crude product is suction-filtered and washed with water. The filter residue is dissolved in methylene chloride, the solution dried and evaporated to yield 5.20 grams of crude, crystalline 18,20-lactone of 3α,11α,20β-trihydroxy-5β-pregnane-18-acid. A test sample recrystallized from methylene chloride and acetone melts at 209–210° C.; optical rotation $[\alpha]_D = -8°$ (in chloroform); infrared bands inter alia at 2.77μ and 2.88μ (OH); 5.69μ (γ-lactone), 7.25μ, 7.37μ, 8.80μ, 9.71μ, 10.18μ, 10.37μ, 10.68μ and 10.88μ.

A mixture of 11 cc. of acetic anhydride and 89 cc. of tetrahydrofuran is added dropwise in the course of 15 minutes while stirring thoroughly to a solution of 33.4 grams of the 18,20-lactone of 3α,11α,20β-trihydroxy-pregnane-18-acid in 500 cc. of absolute tetrahydrofuran. After allowing the reaction mixture to stand for 3 days at room temperature it is evaporated at a water-jet vacuum, xylene is added, and the mixture is again evaporated at a water-jet vacuum, this operation being repeated twice with benzene. The crystalline residue is chromatographed on 1.2 kg. of aluminum oxide (activity II) and the crystalline fractions recrystallized from a mixture of methylene chloride and ether to yield, in addition to 21.43 grams of starting material, 4.2 grams of the 18,20-lactone of 3α-acetoxy-11α,20β-dihydroxy-pregnane-18-acid which on being recrystallized melts at 227–227.5° C. Optical rotation [α]$_D$=+13° (c.=1.013 in chloroform). Infrared spectrum (solvent: methylene chloride): 5.74μ (hydroxyl), 5.69μ (lactone), 5.78μ and 8.08μ (acetate).

4.86 grams of the crude 18.20-lactone of 3α,11α,20β-trihydroxy-5β-pregnane-18-acid are dissolved in 160 cc. of acetone. The solution is cooled to +5° C. and there is added a solution of 3.0 grams of N-bromacetamide in 25 cc. of water and 0.05 cc. of hydrogen peroxide of 30% strength, and the mixture is allowed to stand for 3 hours in the dark at 0–5° C. The reaction mixture is then diluted with 160 cc. of methylene chloride, washed with a solution of 6.0 grams of sodium bisulfite in 160 cc. of water and with saturated sodium chloride solution, the organic solution dried and evaporated to dryness in a water-jet vacuum. The crystalline residue is dissolved in 100 cc. of glacial acetic acid and, after adding 10 grams of zinc dust, the whole is stirred for 30 minutes at room temperature, suction-filtered and the filter residue washed with benzene. The filtrate is evaporated in a water-jet vacuum, the residue taken up in methylene chloride and washed with sodium bicarbonate solution until the washings are neutral. From the dried methylene chloride solution there are obtained 4.48 grams of crude crystalline 18,20-lactone of 3-oxo-11α,20β-dihydroxy-5β-pregnane-18-acid. The product recrystallized from a mixture of methylene chloride and ether melts at 238–240° C.; optical rotation [α]$_D$=0° (in chloroform). Infrared bands inter alia at 2.77μ (OH), 5.70μ (γ-lactone), 5.85μ (3-ketone), 7.25μ, 7.39μ, 7.46μ, 8.79μ and 9.78μ.

3.207 grams of the 18,20-lactone of 3-oxo-11α,20β-dihydroxy-5β-pregnane-18-acid are allowed to stand for 2 days at 20–25° C. in a mixture of 15 cc. of pyridine and 15 cc. of acetic anhydride. The reaction mixture is then evaporated to dryness in a water-jet vacuum, the residue taken up in methylene chloride and washed with water. The solution is dried and evaporated to yield a crystalline residue from which by crystallization from ether 3.42 grams of pure 18,20-lactone of 3-oxo-11α-acetoxy-20β-hydroxy-5β-pregnane-18-acid melting at 196–198° C. are isolated; optical rotation [α]$_D$=−12° (in chloroform). Infrared bands inter alia at 5.70μ (γ-lactone), 5.77μ (acetate), 5.83μ (3-ketone), 7.28μ, 8.12μ, 8.79μ and 9.77μ.

1.00 gram of the 18,20-lactone of 3-oxo-11α-acetoxy-20β-hydroxy-5β-pregnane-18-acid is dissolved in 10 cc. of glacial acetic acid and 2.80 cc. of an 0.955-molar bromine solution in glacial acetic acid are added with stirring in the course of 5 minutes. 10 minutes after the addition is complete the reaction mixture is poured into 150 cc. of water, the crystalline precipitate is suctioned off and washed thoroughly with water. The filter residue is crystallized from a mixture of methylene chloride and ether to yield 1.07 grams of the 18,20-lactone of 4-bromo-3-oxo-11α-acetoxy-20β-hydroxy-5β - pregnane-18-acid melting at 196–197° C. (with decomposition). The compound exhibits in the infrared spectrum in methylene chloride inter alia the following bands; 5.70 (γ-lactone), 5.77μ (acetate and 3-ketone), 7.28μ, 8.15μ, 8.17μ, 9.00μ, 9.78μ, and 10.39μ.

866 mg. of the 18,20-lactone of 4-bromo-3-oxo-11α-acetoxy-20β-hydroxy-5β-pregnane-18-acid are stirred in 10 cc. of a solution of lithium chloride in dimethylformamide of 10% strength for 2 hours at 100° C. under nitrogen. The reaction mixture is then poured into 150 cc. of water, the crystalline precipitate is suctioned off and washed with water. The filter residue is crystallized from methanol to yield 424 mg. of the pure 18,20-lactone of Δ$^4$ - 3 - oxo - 11α - acetoxy - 2β - hydroxy - pregnene-18-acid melting at 186–187° C.; optical rotation [α]$_D$=+63° (in chloroform); λ$_{max.}$=241 mμ (ε=15,400).

Infrared bands inter alia at 5.70μ (γ-lactone), 5.78μ (acetate), 5.99μ and 6.19μ (Δ$^4$-3-ketone), 7.28μ, 7.39μ, 8.13μ, 8.74μ, 9.77μ and 10.42μ.

From the aqueous filtrate there are obtained by extraction with methylene chloride another 205 mg. of the compound.

*Example 24*

10.37 grams of the 18,20-lactone of 3β,11α-diacetoxy-20β-hydroxy-5α-pregnane-18-acid are dissolved in 750 cc. of methanol and after adding a solution of 3.31 grams of potassium carbonate in 75 cc. of water the whole is allowed to stand for 24 hours at 20–25° C. 10 cc. of glacial acetic acid are added, the solution evaporated almost to dryness in a water-jet vacuum, 500 cc. of water added and the crude 18,20-lactone of 3β,20β-dihydroxy-11α-acetoxy-5α-pregnane-18-acid (about 9.8 grams) separated by filtration. A test sample crystallized from methanol melts at 197–199° C., optical rotation [α]$_D$=−29.4° (in chloroform), infrared bands inter alia at 2.79μ (OH), 5.70μ (γ-lactone), 5.78μ (acetate), 8.13μ, 8.79μ, 9.70μ, 10.10μ and 10.45μ.

The same compound is also obtained when 2.70 grams of the 18,20-lactone of 3β,11α-diacetoxy-20β-hydroxy-5α-pregnane-18-acid dissolved in 150 cc. of methanol are allowed to stand with 15 cc. of concentrated hydrochloric acid for 24 hours at 25° C., the reaction mixture is evaporated after the addition of 5.0 grams of crystalline sodium acetate, the residue stirred with water and the insoluble crude product recrystallized from methanol.

In a completely analogous manner the 18,20-lactone of 3α,11α-diacetoxy-20β-hydroxy-5β-pregnane-18-acid is hydrolyzed to form the 18,20-lactone of 3α,20β-dihydroxy-11α-acetoxy-5β-pregnane-18-acid.

9.8 grams of the crude 18,20-lactone of 3β,20β-dihydroxy-11α-acetoxy-5α-pregnane-18-acid are dissolved in 200 cc. of acetone and after cooling the solution to −10° C., a solution of 2.65 grams of chromium trioxide and 2.3 cc. of concentrated sulfuric acid diluted to 10 cc. with water is added in the course of 10 minutes. When the addition is complete, stirring is continued for 15 minutes at −5–0° C., a solution of 110 grams of crystalline sodium acetate in 160 cc. of water is then added, the reaction mixture diluted with benzene and the aqueous layer separated. The latter is extracted with benzene, the benzene solutions washed with saturated sodium chloride solution, dried and evaporated. The residue (9.62 grams) is recrystallized from acetone-hexane to yield 8.4 grams of the 18,20-lactone of 3-oxo-11α-acetoxy-20β-hydroxy-5α-pregnane-18-acid melting at 181–183° C.

In an analogous manner there is obtained the 18,20-lactone of 3-oxo-11α-acetoxy-20β-hydroxy-5β-pregnane-18-acid melting at 196–198° C. by oxidizing the 18,20-lactone of 3α,20β-dihydroxy-11α-acetoxy-5β-pregnane-18-acid.

2.0 grams of the 18,20-lactone of 3-oxo-11α-acetoxy-20β-hydroxy-5α-pregnane-18-acid are dissolved in 10 cc. of glacial acetic acid, and 5.4 cc. of an 0.953-molar bromine solution in glacial acetic acid are added dropwise with stirring in the course of 5 minutes. After another 5 minutes the reaction mixture is poured into 200 c. of water and the crude monobromide is separated by filtration. The faintly reddish filter residue is dissolved in methylene chloride, the solution washed with water, dried and evaporated in a water-jet vacuum. The residue is heated at 120° C. for 17 hours with stirring under nitrogen after the addition of 500 mg. of lithium carbonate in 20 cc. of a 10% solution of lithium chloride in dimethylformamide. After cooling, the reaction mixture is poured into a mixture of 200 cc. of water and 10 cc. of 2 N-sulfuric acid and the precipitate is suctioned off. The filter residue is then taken up in methylene chloride, the solution washed with water, dried and evaporated. The crystalline residue is dissolved in benzene, filtered through 10 grams of aluminum oxide, the column rinsed well with benzene and the benzene solution concentrated in a water-jet vacuum. The residue is crystallized from ether to yield 1.51 grams of crude crystallizate melting at 173–178° C. which contains, in addition to the 18,20-lactone of $\Delta^4$-3-oxo-11α-acetoxy-20β-hydroxy-pregnene-18-acid, also a small quantity of the 18,20-lactone of $\Delta^1$-3-oxo-11α-acetoxy-20β-hydroxy-5α-pregnene-18-acid.

By careful chromatography on 50 grams of aluminum oxide the $\Delta^1$-compound is obtained which, after being crystallized from methanol, melts at 188–193° C., optical rotation $[\alpha]_D = +27.4°$, infrared spectrum: bands inter alia at 5.68μ, 5.75μ, 5.95μ, 6.18μ, 7.26μ, 8.10μ, 8.74μ, 9.74μ, 10.46μ, ultraviolet maximum at 231 mμ ($\epsilon = 11,100$).

From the following fractions the pure 18,20-lactone of $\Delta^4$-3-oxo-11α-acetoxy-20β-hydroxy-pregnene-18-acid melting at 186–187° C. is obtained; optical rotation $[\alpha]_D = +63°$ (in chloroform), ultraviolet maximum at 239 mμ $\epsilon = 15,200$).

In an analogous manner there is obtained the 18,20-lactone of $\Delta^4$-3-oxo-11α-propionyloxy-20β-hydroxy-pregnene-18-acid from the 18,20-lactone of 3-oxo-11α-propionyloxy-20β-hydroxy-5α-pregnane-18-acid.

*Example 25*

A suspension of 60 grams of dry lead tetraacetate and 20 grams of dry calcium carbonate is heated to the boil with stirring. After one hour the mixture is treated with 16 grams of iodine and 10 grams of $\Delta^5$-3-ethylenedioxy-11α-acetoxy-20α-hydroxy-pregnene and washed with 70 cc. of cyclohexane. The reaction mixture is then refluxed for 2 hours with stirring and irradiation with a 500-watt lamp. After cooling, the undissolved salts are suctioned off, the residue is washed with 750 cc. of cyclohexane and the filtrate extracted with an ice-cold solution of 50 grams of sodium thiosulfate in 200 cc. of water. The reaction solution is then washed twice with 200 cc. of water, treated with 5 cc. of pyridine, dried with sodium sulfate and evaporated in a water-jet vacuum at a bath temperature of 35° C. The resulting crude product is dissolved in 100 cc. of pyridine and added to an oxidation mixture prepared from 20 grams of silver chromate and 10 grams of chromium trioxide with 100 cc. of water and 100 cc. of pyridine. After stirring for 16 hours at an internal temperature of 60° C., the mixture is cooled, rinsed with 500 cc. of water, 100 cc. of saturated sodium chloride solution and 800 cc. of ethyl acetate in a separating funnel, thoroughly agitated, filtered and rinsed twice with 600 cc. of ethyl acetate each time. The organic solutions are washed three times with 300 cc. of water each time, dried with sodium sulfate and evaporated in vacuo. The resulting brown colored oil is dissolved in 50 cc. of a mixture of benzene and ethyl acetate (9:1) and filtered through 40 grams of silica gel (containing 15% of water), rinsing with 950 cc. of a mixture of benzene and ethyl acetate (9:1). The eluate is evaporated in water-jet vacuum and the residue is recrystallized from a mixture of methylene chloride and ether to yield 4.5 grams of the 18,20-lactone of $\Delta^5$-3-ethylenedioxy-11α-acetoxy-20α-hydroxy-pregnene-18-acid melting at 250–256° C.

8.0 grams of this compound are suspended in 150 cc. of methanol and after the addition of 3.85 grams of potassium carbonate in 19.2 cc. of water the whole is heated to the boil for 10 hours with stirring and under nitrogen. After cooling, the solvent is removed as completely as possible in a water-jet vacuum, 200 cc. of water are then added and the crude 18,20-lactone of $\Delta^5$-3-ethylenedioxy-11α,20α-dihydroxy-pregnene-18-acid (6.9 grams) melting at 192–245° C. is separated by filtration.

1.0 gram of this compound is dissolved in 10 cc. of pyridine and added to a mixture of 2.0 grams of chromium trioxide in 4 cc. of water and 10 cc. of pyridine and allowed to stand for 15 hours at 20–25° C. Ice is then added and a little sodium sulfite solution, the reaction mixture is extracted with ethyl acetate and the extracts washed with 1.5 N-phosphoric acid and water, the organic solutions are dried and evaporated to dryness. The resulting 18,20-lactone of $\Delta^5$-3-ethylenedioxy-11-oxo-20α-hydroxy-pregnene-18-acid melts at 274–275.5° C. after being recrystallized from a mixture of methylene chloride and ether; optical rotation $[\alpha]_D = -23.5°$.

The crude product in a mixture of 90 cc. of alcohol, 10 cc. of N-sodium hydroxide solution and 100 cc. of tetrahydrofuran is reduced (as described in Example 6) for 3 days at 40° C. with 2.0 grams of sodium borohydride. The crude product obtained by extraction with ethyl acetate is crystallized from methylene chloride and ether to yield the 18,11-lactone of $\Delta^5$-3-ethylenedioxy-11β,20α-dihydroxy-pregnene-18-acid melting at 164–168° C.

500 mg. of this compound are oxidized in 12.5 cc. of acetone with chromic acid-sulfuric acid solution at $-10°$ C. After working up in the ordinary manner there are obtained 447 mg. of the pure 18,11-lactone of $\Delta^5$-3-ethylenedioxy-11β-hydroxy-20-oxo-pregnene-18-acid melting at 232–236° C.

*Example 26*

15.0 grams of $\Delta^5$-3β-acetoxy-20β-hydroxy-pregnene of M.P. 164–166° C. are oxidized with irradiation as described in Example 25 in 3 liters of cyclohexane with 90 grams of lead tetraacetate and 30 grams of calcium carbonate. The resulting crude product is dissolved in 150 cc. of pyridine and oxidized for 16 hours at 60° C. with 30 grams of silver chromate and 15 grams of chromium trioxide in 150 cc. of water and 150 cc. of pyridine. The reaction mixture is worked up as described in Example 25. By crystallizing the crude product from a mixture of methylene chloride and ether there are obtained 7.5 grams of the 18,20-lactone of $\Delta^5$-3β-acetoxy-20β-hydroxy-pregnene-18-acid melting at 204–206° C.

5.0 grams of this compound are dissolved in 300 cc. of methanol and, after the addition of 3.0 grams of potassium carbonate in 60 cc. of water, allowed to stand for 16 hours at 20–25° C. 5 cc. of glacial acetic acid are then added, the reaction solution is evaporated to dryness in a water-jet vacuum, and the residue stirred with 200 cc. of water. The crude 18,20-lactone of $\Delta^5$-3β,20β-dihydroxy-pregnene-18-acid is suctioned off, the filter residue dissolved in 500 cc. of toluene. 50 cc. of cyclohexanone are added and 100 to 150 cc. of solvent are distilled off to begin with. While continuing to distill off a further quantity of solvent slowly, the reaction mixture is added dropwise in the course of half an hour to a solution of 3 grams of aluminum tertiary butylate in 100 cc. of absolute toluene. When the addition is complete, the whole is boiled under reflux for 5 hours, 30 cc. of saturated Rochelle salt solution are added and the volatile constituents removed by distillation with steam. The cooled mixture is then extracted with methylene chloride and the extracts washed with water, dried and evaporated. The residue is crystallized from a mixture of methylene chloride and ether to yield the pure 18,20-lactone of $\Delta^4$-3-oxo-20β-hydroxy-pregnene-18-acid, M.P. 208–210° C.

For the purpose of introducing the 11α-hydroxyl group 4 liters of a nutrient solution which contains the following ingredients per liter of tap water are prepared: 10 grams of crude glucose, 10 grams of Distillers solubles, 5 grams of sodium chloride and 1 gram of sodium nitrate; the pH is adjusted to 5.5. The solution is put into a shaker and is sterilized for 30 minutes at 1.1 atmospheres gauge pressure. The cooled nutrient solution is inoculated with a culture of *Aspergillus ochraceus* (CIBA 924) and shaken at 26° C. After 2 days the organism has developed well. A solution of 1 gram of the 18,20-lactone of $\Delta^4$-3-oxo-20β-hydroxy-pregnene-18- acid suspended in 20 cc. of acetone is then added under sterile conditions, and shaking is continued at the same temperature. After another two days the mycelium is separated, suspended for 1 hour in 800 cc. of warm acetone and then filtered again. The acetone filtrate is very extensively concentrated in vacuo and then combined with the culture filtrate. The combined filtrates are then extracted three times with 1 liter of ethyl acetate each time. The extracts are washed with a solution of sodium bicarbonate of 2% strength and with water, dried over sodium sulfate, filtered and evaporated to dryness in vacuo at 30–35° C. 1.2 grams of an oily residue are obtained in which the 18,20-lactone of Δ⁴-3-oxo-11α,20β-dihydroxy-pregnene-18-acid can be identified by paperchromatography.

The product is subjected to preparative separation on paper and the zone absorbing in ultraviolet light and having the same path as authentic 18,20-lactone of Δ⁴-3 - oxo - 11α,20β - dihydroxy - pregnene - 18 - acid is eluted with aqueous tetrahydrofuran to obtain the pure compound which, on being crystallized from a mixture of acetone and ether, melts at 178–179° C., optical rotation [α]_D=+86° (in chloroform).

The Δ⁵-3β-acetoxy-20β-hydroxy-pregnene melting at 164–168° C., used as starting material in this example, is obtained from pregnenolone acetate by reduction with lithium tri-tertiary butoxy aluminum hydride in tetrahydrofuran and crystallization of the crude product from acetone in a yield of about 64%.

*Example 27*

20 grams of 18,20-lactone of Δ⁵-3-ethylenedioxy-11α,20β-dihydroxy-pregnene-18-acid are dissolved in 400 cc. of acetone. After cooling to —10° C., the reaction mixture is treated with 25 cc. of an oxidation solution prepared from 26.27 grams of chromium trioxide and 23.0 cc. of concentrated sulfuric acid diluted with water to make 100 cc. The mixture is stirred for 20 minutes at a temperature of —5 to 0° C., then treated with a solution of 220 grams of crystalline sodium acetate in 320 cc. of water and the oxidation product is extracted with benzene. After evaporating the benzene extracts, a crystalline residue is obtained which is recrystallized from a mixture of methylene chloride and ether to yield 19.2 grams of the pure 18,20-lactone of Δ⁵-3-ethylenedioxy-11-oxo-20β-hydroxy-pregnene-18-acid melting at 245–250° C.

What is claimed is:

1. A compound of the formula

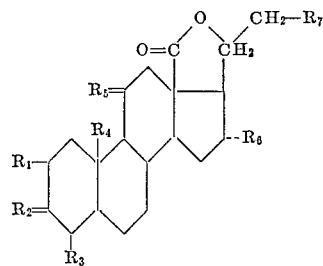

in which each of R₁ and R₃ represents a member selected from the group consisting of hydrogen and bromine, R₂ stands for a member selected from the group consisting of oxo, lower alkylenedioxy, hydrogen together with hydroxy and hydrogen together with acyloxy, each of R₄ and R₆ represents a member selected from the group consisting of hydrogen and methyl, R₅ stands for a member selected from the group consisting of oxo, two hydrogen atoms, hydrogen together with hydroxy and hydrogen together with acyloxy and R₇ represents a member selected from the group consisting of hydrogen, hydroxy and acyloxy, at least one of the radicals R₁, R₃, R₅, R₆ and R₇ being different from hydrogen when R₄ represents methyl, and R₂ a member selected from the group consisting of hydrogen together with hydroxy and hydrogen together with acyloxy and at least one of the radicals R₁, R₃, R₆ and R₇ being different from hydrogen when R₄ represents methyl and both R₂ and R₅ represent oxo, said acyloxy radicals being derived from acids selected from the group consisting of lower alphatic, monocyclic carbocyclic aliphatic, monocyclic heterocyclic aliphatic, monocyclic carbocyclic aromatic, monocyclic heterocyclic aromatic and monocyclic carbocyclic aromatic-lower aliphatic carboxylic acids containing at most two carboxyl groups, of lower alkane sulfonic and monocyclic carbocyclic aromatic sulfonic acids.

2. An unsaturated compound of the formula

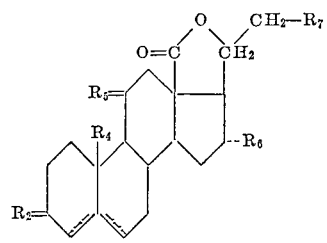

in which R₂ stands for a member selected from the group consisting of oxo, lower alkylenedioxy, hydrogen together with hydroxy and hydrogen together with acyloxy, each of R₄ and R₆ represents a member selected from the group consisting of hydrogen and methyl, R₅ stands for a member selected from the group consisting of oxo, two hydrogen atoms, hydrogen together with hydroxy and hydrogen together with acyloxy and R₇ represents a member selected from the group consisting of hydrogen, hydroxy and acyloxy, at least one of the radicals, R₆ and R₇ being different from hydrogen when R₄ represents methyl, R₅ oxo and R₂ a member selected from the group consisting of oxo and ethylenedioxy, said acyloxy radicals being derived from the acids described in claim 1.

3. A compound of the formula

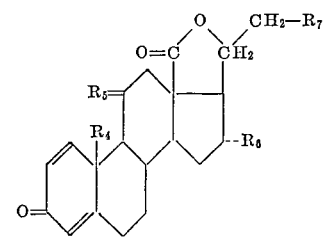

in which each of R₄ and R₆ represents a member selected from the group consisting of hydrogen and methyl, R₅ stands for a member selected from the group consisting of oxo, two hydrogen atoms, hydrogen together with hydroxy and hydrogen together with acyloxy and R₇ represents a member selected from the group consisting of hydrogen, hydroxy and acyloxy, said acyloxy radicals being derived from the acids described in claim 1.

4. A member selected from the group consisting of a compound of the formula

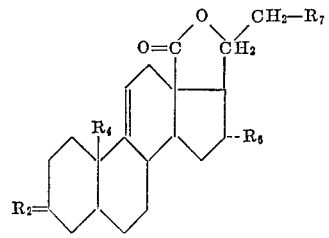

and the dehydro derivatives therof containing a double bond extending from the carbon atom 5, in which $R_2$ stands for a member selected from the group consisting of oxo, lower alkylenedioxy, hydrogen together with hydroxy and hydrogen together with acyloxy, each of $R_4$ and $R_6$ represents a member selected from the group consisting of hydrogen and methyl and $R_7$ represents a member selected from the group consisting of hydrogen, hydroxy and acyloxy, said acyloxy radicals being derived from the acids described in claim 1.

5. A compound of the formula

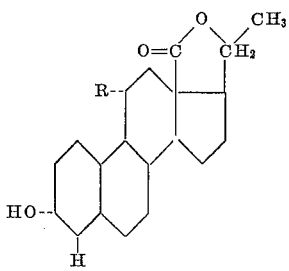

in which R represents a member selected from the group consisting of hydrogen and hydroxy.

6. The 18,20-lactone of 3-oxo-11α,20-dihydroxy-pregnane-18-acid.

7. A compound of the formula

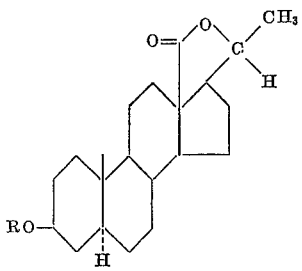

wherein R is selected from the group consisting of hydrogen and lower alkanoyl.

8. A compound of the formula

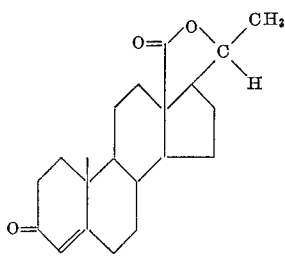

9. The 18,20-lactone of $\Delta^5$-3β,20-dihydroxy-pregnene-18-acid.

10. The 18,20-lactone of $\Delta^4$-3-oxo-20-hydroxy-pregnene-18-acid.

11. The 18,20-lactone of $\Delta^5$-3-ethylenedioxy-20-hydroxy-pregnene-18-acid.

12. The 18,20-lactone of $\Delta^4$-3-oxo-11α,20-dihydroxy-pregnene-18-acid.

13. The 18,20-lactone of $\Delta^4$-3-oxo-11α-acetoxy-20-hydroxy-pregnene-18-acid.

14. The 18,20-lactone of $\Delta^4$-3-oxo-11α-tosyloxy-20-hydroxy-pregnene-18-acid.

15. The 18,20-lactone of $\Delta^5$-3-alkylenedioxy-11α,20-dihydroxy-pregnene-18-acid.

16. The 18,20-lactone of $\Delta^5$-3-ethylenedioxy-11α-acetoxy-20-hydroxy-pregnene-18-acid.

17. The 18,20-lactone of $\Delta^5$-3-ethylenedioxy-11α-tosyloxy-20-hydroxy-pregnene-18-acid.

18. The 18,20-lactone of $\Delta^{4,9(11)}$-3-oxo-20-hydroxy-pregnadiene-18-acid.

19. The 18,20-lactone of $\Delta^{5,9(11)}$-3-ethylenedioxy-20-hydroxy-pregnadiene-18-acid.

20. The 18,20-lactone of $\Delta^{1,4}$-3-oxo-20-hydroxy-pregnadiene-18-acid.

21. The 18,20-lactone of $\Delta^{1,4}$-3-oxo-11α,20-dihydroxy-pregnadiene-18-acid.

22. The 18,20-lactone of 3β,11α,20β-trihydroxy-5α-pregnane-18-acid.

No references cited.

LEWIS GOTTS, *Primary Examiner.*

LESLIE H. GASTON, MORRIS LIEBMAN, *Examiners.*

M. L. WILLIAMS, HENRY A. FRENCH,
*Assistant Examiners.*